United States Patent
Kobayashi et al.

(10) Patent No.: US 8,812,463 B2
(45) Date of Patent: Aug. 19, 2014

(54) APPARATUS AND METHOD FOR PRESENTING CONTENTS IN RELATION TO A SEARCH AXIS

(75) Inventors: Yoshiyuki Kobayashi, Tokyo (JP); Ryo Mukaiyama, Tokyo (JP); Hiroshi Ogino, Tokyo (JP); Soichi Fukasawa, Saitama (JP)

(73) Assignee: Sony Corporation, Tokyo (JP)

( * ) Notice: Subject to any disclaimer, the term of this patent is extended or adjusted under 35 U.S.C. 154(b) by 893 days.

(21) Appl. No.: 12/041,328

(22) Filed: Mar. 3, 2008

(65) Prior Publication Data

US 2008/0215575 A1 Sep. 4, 2008

(30) Foreign Application Priority Data

Mar. 2, 2007 (JP) ................. P2007-052625

(51) Int. Cl.
*G06F 7/00* (2006.01)
*G06F 17/00* (2006.01)

(52) U.S. Cl.
USPC .......................................... 707/694

(58) Field of Classification Search
CPC ............... G06F 17/30696; G06F 17/30867
USPC .................... 707/999.003, 798, 694
See application file for complete search history.

(56) References Cited

U.S. PATENT DOCUMENTS

| | | | |
|---|---|---|---|
| 6,405,195 B1 | 6/2002 | Ahlberg | |
| 6,985,694 B1 * | 1/2006 | De Bonet et al. | 455/3.01 |
| 7,216,116 B1 | 5/2007 | Nilsson et al. | |
| 7,584,159 B1 * | 9/2009 | Chakrabarti et al. | 706/45 |
| 2002/0019858 A1 | 2/2002 | Kaiser et al. | |
| 2002/0147628 A1 * | 10/2002 | Specter et al. | 705/10 |
| 2003/0014407 A1 * | 1/2003 | Blatter et al. | 707/6 |
| 2004/0107821 A1 * | 6/2004 | Alcalde et al. | 84/608 |
| 2005/0076027 A1 | 4/2005 | Kaiser et al. | |
| 2005/0097137 A1 | 5/2005 | Kaiser et al. | |
| 2005/0097138 A1 | 5/2005 | Kaiser et al. | |
| 2005/0165779 A1 | 7/2005 | Kaiser et al. | |

(Continued)

FOREIGN PATENT DOCUMENTS

| | | |
|---|---|---|
| JP | 2000-207415 | 7/2000 |
| JP | 2000-322445 | 11/2000 |

(Continued)

OTHER PUBLICATIONS

Zhu, J. et al., "Perceptual Visualization of a Music Collection," Multimedia and Expo, 2005, ICME 2005., IEEE International Conference on Amsterdam, The Netherlands, vol. 6, Jul. 6, 2005, pp. 1058-1061.

(Continued)

*Primary Examiner* — Alexey Shmatov
(74) *Attorney, Agent, or Firm* — Finnegan, Henderson, Farabow, Garrett & Dunner, LLP

(57) ABSTRACT

An information processing apparatus is disclosed. The apparatus may include a memory storing a program. The apparatus may also include a processor configured to execute the program to cause the apparatus to perform a method. The method may include creating a function relating feature quantities of first contents to known values of the first contents. The method may also include calculating, using the created function, expected values of second contents based on feature quantities of the second contents. In addition, the method may include controlling display of a presentation of the second contents in relation to a search axis, the second contents being positioned along a direction of the search axis based on the calculated expected values.

8 Claims, 27 Drawing Sheets

(56) References Cited

U.S. PATENT DOCUMENTS

| | | | |
|---|---|---|---|
| 2006/0242661 A1 | 10/2006 | Bodlaender et al. | |
| 2007/0044122 A1* | 2/2007 | Scholl et al. | 725/46 |
| 2007/0204227 A1* | 8/2007 | Kretz | 715/727 |
| 2007/0233726 A1* | 10/2007 | Torrens et al. | 707/102 |

FOREIGN PATENT DOCUMENTS

| | | |
|---|---|---|
| JP | 2004-515145 | 5/2004 |
| WO | WO 02/42959 | 5/2002 |
| WO | WO 2004/107757 A1 | 12/2004 |

OTHER PUBLICATIONS

Torrens, M. et al., "Visualizing and Exploring Personal Music Libraries," Proceedings Annual International Symposium on Music Information Retrieval, Oct. 10, 2004, 8 pages.

European Search Report from European Patent Office dated May 9, 2008, for Application No. 08250693.2-1527, 8 pages.

Office Action of Japanese Patent Application No. 2007-052625.

Kurokawa, M. et al., "Empirical Analysis of User Preference Models for Movie Recommendation," Technical Report of IEICE, NC2004-182, pp. 77-82, (2005).

* cited by examiner

FIG. 7

| | QUANTITY 1 | QUANTITY 2 | QUANTITY 3 | PREFERENCE | SONG PLAYED FREQUENTLY | SONG PLAYED IN THE MORNING |
|---|---|---|---|---|---|---|
| SONG 1 | 24 | 74 | 68 | LIKED | YES | NO |
| SONG 2 | 17 | 81 | 50 | LIKED | YES | YES |
| SONG 3 | 33 | 75 | 97 | DISLIKED | NO | NO |
| ... | ... | ... | ... | ... | ... | ... |

FIG.9

| REPRODUCTION HISTORY | | |
|---|---|---|
| SONGS | OPERATIONS | DATES AND TIMES |
| SONG 1 | REPRODUCED | 14:04 09/07/2006 |
| SONG 2 | REPRODUCED | 14:08 09/07/2006 |
| SONG 3 | REPRODUCED | 14:13 09/07/2006 |
| SONG 3 | SKIPPED | 14:15 09/07/2006 |
| SONG 4 | REPRODUCED | 14:15 09/07/2006 |
| SONG 4 | STOPPED | 14:18 09/07/2006 |
| ... | | |

FIG.10

| SONGS | PREFERENCE | INTEREST | FOR PARENTS | OLD |
|---|---|---|---|---|
| SONG 1 | 5 | 3 | 1 | |
| SONG 2 | 3 | 1 | 2 | 3 |
| SONG 3 | | 5 | | 1 |
| SONG 4 | 1 | | 5 | 3 |
| SONG 5 | 5 | | 1 | |
| SONG 6 | 4 | 4 | | 2 |
| ... | | | | |

FIG.11

| LEARNING DATA | |
|---|---|
| SONGS | SOLUTION DATA |
| SONG 1 | 5 |
| SONG 3 | 4 |
| SONG 6 | 2 |
| SONG 12 | 3 |
| SONG 16 | 1 |
| ... | |

|  | PREFERENCE | REPRODUCTION FREQUENCY |
|---|---|---|
| SONG 1 | 0.5 | 0.2 |
| SONG 2 | 0.4 | 0.5 |
| SONG 3 | 0.1 | 0.4 |
| SONG 4 | 0.2 | 0.1 |
| SONG 5 | 0.4 | 0.2 |
| SONG 6 | 0.3 | 0.5 |
| SONG 7 | 0.2 | 0.2 |
| SONG 8 | 0.5 | 0.4 |

SIMILARITY: 0.1

|  | LIKED | PLAYED FREQUENTLY |
|---|---|---|
| SONG 1 | YES | NO |
| SONG 2 | YES | YES |
| SONG 3 | NO | YES |
| SONG 4 | NO | NO |
| SONG 5 | YES | NO |
| SONG 6 | NO | YES |
| SONG 7 | NO | NO |
| SONG 8 | YES | YES |

SIMILARITY: 0.5

FIG. 24

| | PREFERENCE | REPRODUCTION FREQUENCY | CLASSIC | SOOTHING | ... |
|---|---|---|---|---|---|
| PREFERENCE | 0.5 | 0.8 | 0.9 | 0.6 | |
| REPRODUCTION FREQUENCY | 0.4 | 0.5 | 0.9 | 0.5 | |
| TASTEFUL | 0.7 | 0.6 | 0.4 | 0.1 | |
| INTENCE | 0.5 | 0.9 | 0.3 | 0.8 | |
| ... | | | | | |

ANOTHER USER'S SEARCH AXIS FOR COMPARISON

USER'S SEARCH AXIS

FIG. 25

| | PREFERENCE | REPRODUCTION FREQUENCY | CLASSIC | SOOTHING | ... |
|---|---|---|---|---|---|
| PREFERENCE | 0.5 | 0.8 | 0.9 | 0.6 | |
| REPRODUCTION FREQUENCY | 0.4 | 0.5 | 0.9 | 0.5 | |
| TASTEFUL | 0.7 | 0.6 | 0.4 | 0.1 | |
| INTENCE | 0.5 | 0.9 | 0.3 | 0.8 | |
| ... | | | | | |

USER'S SEARCH AXIS (rows)
ANOTHER USER'S SEARCH AXIS FOR COMPARISON (columns)

APPARATUS AND METHOD FOR PRESENTING CONTENTS IN RELATION TO A SEARCH AXIS

CROSS REFERENCES TO RELATED APPLICATIONS

The present invention contains subject matter related to Japanese Patent Application JP 2007-052625 filed with the Japan Patent Office on Mar. 2, 2007, the entire contents of which being incorporated herein by reference.

BACKGROUND OF THE INVENTION

1. Field of the Invention

The present invention relates to an information processing apparatus, an information processing method, and a program. More particularly, the invention to an information processing apparatus, an information processing method, and a program for presenting contents.

2. Description of the Related Art

It has been practiced to furnish contents such as songs and moving images with metadata indicating users' evaluations of the contents.

A user is able to know easily whether contents are to his or her taste by furnishing these contents with metadata indicative of his or her preferences.

Some recording and reproducing apparatuses have been designed to provide the user with desired information in response to the user's operations in reference to variable data numerically representative of the impressions gained from the contents of interest. One such apparatus is disclosed illustratively in Japanese Patent Laid-open No. 2000-207415.

SUMMARY OF THE INVENTION

However, the user is unable to know whether a given content is to his or her taste unless and until the content is furnished with metadata indicating the user's preferences.

In order to recognize the user's likes and dislikes for all contents in his or her possession, the user must furnish in advance the contents with metadata representing his or her preferences.

If the user possesses numerous contents, furnishing all of them with preference metadata amounts to a formidable task.

The present invention has been made in view of the above circumstances and provides arrangements such as to present the user with contents to his or her taste more easily than before in a visually displayed manner.

In carrying out the present invention and according to one embodiment thereof, there is provided an information processing apparatus including: a creation section; and a display control section. The creation section is configured to create, through learning, a search axis which serves as a reference for presenting contents and which is determined by feature quantities of the contents and either by a history of reproduction of the contents by a user or by evaluations of the contents by the user. The display control section is configured to control display of the presentation of the contents in reference to the search axis having been created.

Preferably, the information processing apparatus according to the present embodiment may further include a computation section configured to compute values of the contents on the search axis having been created.

Preferably, the computation section may compute the search axis values based on the feature quantities of the contents.

Preferably, the computation section may compute the values of the contents on a plurality of search axes having been created.

Preferably, the creation section may create the search axis by obtaining through learning a regression equation for computing values of the contents on the search axis based on the feature quantities of the contents and either on the history of reproduction of the contents by the user or on the evaluations of the contents by the user.

Preferably, the creation section may create the search axis by obtaining through learning a discriminant for computing values of the contents on the search axis based on the feature quantities of the contents and either on the history of reproduction of the contents by the user or on the evaluations of the contents by the user.

Preferably, the display control section may display an image indicating the contents in positions reflecting the values of the contents on the search axes which define a space covering these positions.

Preferably, the information processing apparatus according to the present embodiment may further include a selection section configured to select, from the contents of which the values on the search axis are displayed, those contents which fall into a predetermined range of the search axis.

According to another embodiment of the present invention, there is provided an information processing method including the steps of: creating, through learning, a search axis which serves as a reference for presenting contents and which is determined by feature quantities of the contents and either by a history of reproduction of the contents by a user or by evaluations of the contents by the user; and controlling display of the presentation of the contents in reference to the search axis having been created.

According to a further embodiment of the present invention, there is provided a program for causing a computer to carry out a process including the steps of: creating, through learning, a search axis which serves as a reference for presenting contents and which is determined by feature quantities of the contents and either by a history of reproduction of the contents by a user or by evaluations of the contents by the user; and controlling display of the presentation of the contents in reference to the search axis having been created.

According to the present invention embodied as outlined above, through learning, a search axis is created which serves as a reference for presenting contents and which is determined by feature quantities of the contents and either by a history of reproduction of the contents by a user or by evaluations of the contents by the user. Control is then provided to display the presentation of the contents in reference to the search axis having been created.

Contents can thus be presented as outlined according to the present embodiment.

Contents can be further presented to the user in accordance with the user's preferences more easily than before.

BRIEF DESCRIPTION OF THE DRAWINGS

FIG. 7 is another tabular view explanatory of how search axis values are computed;

FIG. 9 is a schematic view showing a typical history of reproduction of songs by a user;

FIG. 10 is a schematic view showing typical feedback values;

FIG. 11 is a schematic view showing typical learning data;

FIG. 24 is a tabular view showing typical similarities between search axes;

FIG. 25 is another tabular view showing typical similarities between search axes;

DETAILED DESCRIPTION OF THE PREFERRED EMBODIMENTS

Preferred embodiments of the present invention will hereinafter be described. Correspondences between constitutional requirements of the present invention and embodiments described in the detailed description of the invention are illustrated as follows. This description is to confirm that embodiments supporting the present invention are described in the detailed description of the invention. Therefore, even when there is an embodiment described in the detailed description of the invention but not described here as corresponding to a constitutional requirement, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Figure 2:
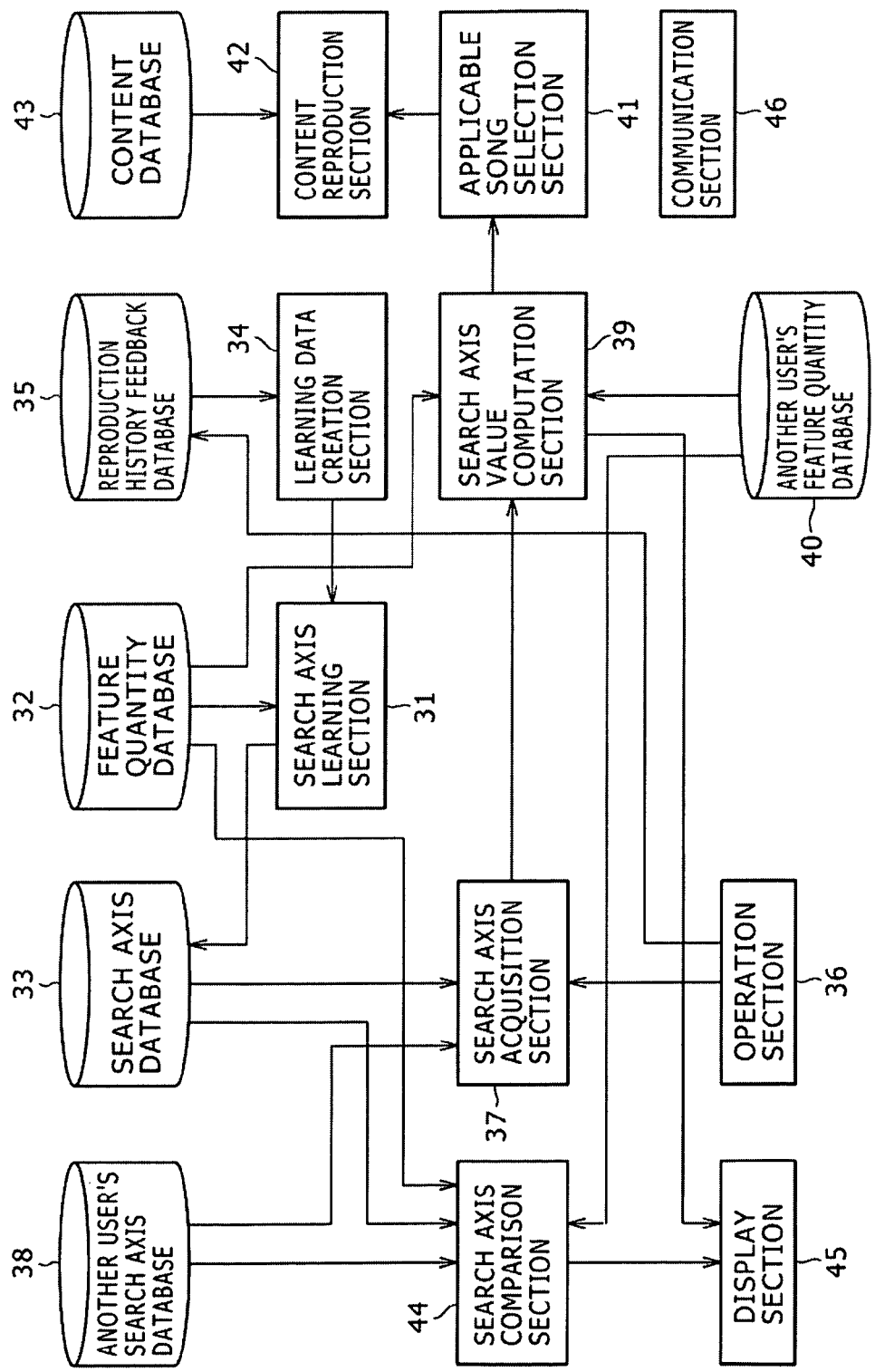
FIG. 2 is a block diagram showing a typical structure of a song search apparatus.

One preferred embodiment of the present invention is an information processing apparatus including: a creation section (e.g., search axis learning section 31 in FIG. 2); and a display control section (e.g., display section 45 in FIG. 2). The creation section is configured to create, through learning, a search axis which serves as a reference for presenting contents and which is determined by feature quantities of the contents and either by a history of reproduction of the contents by a user or by evaluations of the contents by the user. The display control section is configured to control display of the presentation of the contents in reference to the search axis having been created.

Preferably, the information processing apparatus as one embodiment of the present invention may further include a computation section (e.g., search axis value computation section 39 in FIG. 2) configured to compute values of the contents on the search axis having been created.

Preferably, the information processing apparatus embodying the present invention may further include a selection section (e.g., applicable song selection section 41 in FIG. 2) configured to select, from the contents of which the values on the search axis are displayed, those contents which fall into a predetermined range of the search axis.

Figure 34:
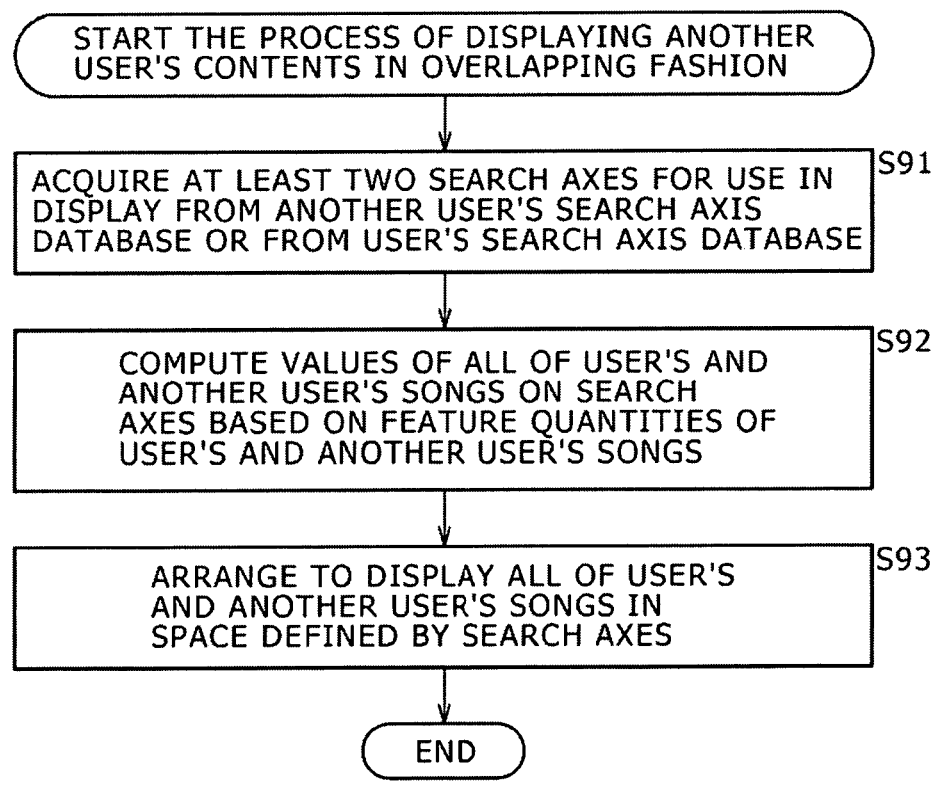
FIG. 34 is a flowchart of steps constituting a typical process of displaying another user's contents in overlapping fashion.

Another preferred embodiment of the present invention is an information processing method as well as a program for causing a computer to carry out a process, the method as well as the process including the steps of: creating (e.g., in step S14 of FIG. 14); and controlling (e.g., in step S93 of FIG. 34). The creating step through learning, a search axis which serves as a reference for presenting contents and which is determined by feature quantities of the contents and either by a history of reproduction of the contents by a user or by evaluations of the contents by the user. The controlling step displays of the presentation of the contents in reference to the search axis having been created.

Figure 1:
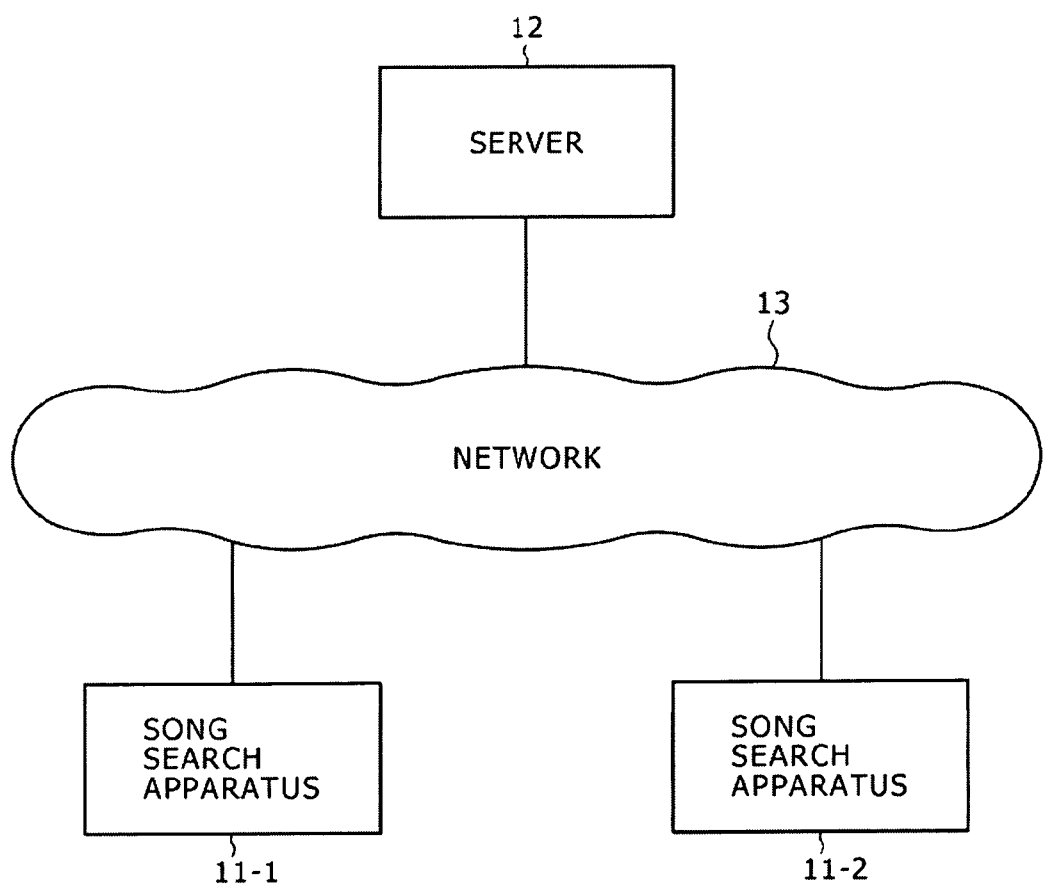
FIG. 1 is a block diagram showing a typical configuration of a song search system.

FIG. 1 is a block diagram showing a typical configuration of a song search system. This song search system is made up of song search apparatuses 11-1 and 11-2, a server 12, and a network 13.

The song search apparatuses 11-1 and 11-2 and the server 12 are interconnected by way of the network 13.

The song search apparatuses 11-1 and 11-2 are illustratively an information processing apparatus each. The apparatus searches for and acquires songs as typical contents and presents their users with the contents thus obtained.

The term "content" or "contents" may be understood as information useful for the user. Illustratively, the contents include songs (sounds), moving images, still images, texts, data, or programs. In the description that follows, the contents will be represented illustratively by songs.

For example, the song search apparatus 11-1 or 11-2 creates, through learning, a search axis which serves as a reference for presenting songs as contents and which is determined by feature quantities of the songs and either by a history of reproduction of the songs by the user or by evaluations of the songs by the user. The apparatus further controls display of the presentation of the songs in reference to the search axis having been created.

The term "search axis" or "search axes" refers to a reference or references by which to present contents in accordance with content-related information. Illustratively, the search axes may be defined as spatial coordinate axes that determine positions (i.e., coordinate positions) of contents corresponding to the content-related information in a space defined by the coordinate axes.

The search axes may illustratively be the coordinate axes that define a given coordinate system. More specifically, in the space of an orthogonal coordinate system or an oblique coordinate system, the search axes are represented by straight lines. In polar coordinate systems such as the circular coordinate system, cylindrical coordinate system and spherical coordinate system, as well as in other coordinate systems, the search axes may be represented by straight lines, curves or angles providing the references. The search axes may or may not be displayed in practice.

Illustratively, the song search apparatus 11-1 computes the similarity between two search axes serving as references by which to present songs, one axis being created from information about the user of the apparatus 11-1 and the other axis from information about the user of the song search apparatus 11-2. The apparatus 11-1 proceeds to display values of the songs on the two search axes that are found similar to each other. The song search apparatus 11-2 may likewise compute the similarity between two search axes serving as references by which to present songs, one axis being created from information about the user of the apparatus 11-2 and the other axis from information about the user of the song search apparatus 11-1. The apparatus 11-2 may then display values of the songs on the two search axes that have turned out to be similar to one another.

The song search apparatus 11-1 may acquire from the song search apparatus 11-2 the search axes created from the information about the user of the apparatus 11-2 by way of the network 13. Similarly, the song search apparatus 11-2 may obtain from the song search apparatus 11-1 the search axes created from the information about the user of the apparatus 11-1 through the network 13.

As will be discussed later in detail, the values of contents on the search axes are acquired using a regression equation or discriminants. To obtain a search axis means to acquire the regression equation or discriminants defining the search axis in question.

The server 12 acquires from the song search apparatus 11-1 or 11-2 the search axes created from the information about the user of the applicable apparatus by way of the network 13, and records the search axes thus obtained. Furthermore, the server 12 retrieves from its storage the search axes created from the information about the users of the song search apparatuses 11-1 and 11-2, and offers the retrieved search axes to the apparatus 11-1 or 11-2 via the network 13.

In the description that follows, the song search apparatuses 11-1 and 11-2 may be simply referred to as the song search apparatus 11 if there is no need to distinguish between them.

FIG. 2 is a block diagram showing a typical structure of the song search apparatus 11 as a typical information processing apparatus embodying the present invention. The song search apparatus 11 is constituted by a search axis learning section 31, a feature quantity database (DB) 32, a search axis database (DB) 33, a learning data creation section 34, a reproduction history feedback database (DB) 35, an operation section 36, a search axis acquisition section 37, another user's search axis database (DB) 38, a search axis value computation section 39, another user's feature quantity database (DB) 40, an applicable song selection section 41, a content reproduction section 42, a content database (DE) 43, a search axis comparison sect on 44, a display section 45, and a communication section 46.

The search axis learning section 31 creates, through learning, a search axis which serves as a reference for presenting songs and which is determined by the feature quantities of the songs and either by the history of reproduction of the songs by the user or by the evaluations of the songs by the user. Illustratively, the search axis learning section 31 may create a search axis as a reference for song presentation through learning involving the feature quantities of the songs supplied by the feature quantity database 32, and either the history of reproduction of the songs by the user or the evaluation of the songs by the user following retrieval from the reproduction history feedback database 35 via the learning data creation section 34.

A feature quantity may be any value characteristic of a given content. Typically, the feature quantities of contents may be their metadata or may be computed based on the metadata or on the contents themselves represented by the metadata.

Illustratively, the search axis learning section 31 may acquire regression equation or discriminants for computing values of songs on a search axis serving as a reference for presenting the songs (the values may be called search axis values), through learning involving the feature quantities of the songs retrieved from the feature quantity database 32 and either the history of reproduction of the songs or the evaluations of the songs by the user following transfer from the learning data creation section 34.

The search axis learning section 31 supplies the created search axis to the search axis database 33. That is, the search axis learning section 31 supplies the search axis database 33 with the regression equation or discriminants for computing the values of songs on the search axis serving as a reference for song presentation.

The feature quantity database 32 stores the feature quantities of the songs owned by the user. For example, the feature quantity database 32 may store the metadata of the songs as their feature quantities.

The search axis database 33 stores the search axes which have been created by the search axis learning section 31 and which serve as the references for presenting songs. In other words, the search axis database 33 stores regression equation or discriminants for computing the values of songs on the search axes serving as the references for presenting the songs in question.

From the history of reproduction of songs by the user or from the evaluations of the songs by the user following retrieval from the reproduction history feedback database 35, the learning data creation section 34 removes data unnecessary for the learning of the search axis to be generated and creates learning data for use in learning by the search axis learning section 31. The learning data creation section 34 supplies the learning data thus created to the search axis learning section 31.

The reproduction history feedback database 35 stores the history of reproduction of songs by the user and the evaluations of the songs by the user as feedback. In operation, the reproduction history feedback database 35 retrieves from its storage the history of reproduction of songs by the user or the evaluations of these songs by the user and supplies what is retrieved to the learning data creation section 34.

The operation section 36 is made up of buttons, a keyboard, a mouse, a remote controller and/or a touch-sensitive pad, as well as a control device for controlling these components. In response to the user's operations, the operation section 36 supplies the search axis acquisition section 37 with relevant information indicative of the search axis or axes for use in search. Alternatively, the operation section 36 may supply the reproduction history feedback database 35 with the evaluations of songs by the user as feedback in response to the user's operations.

Furthermore, when the display section 45 is giving a display about the presentation of songs in reference to a search axis, the operation section 36 supplies the applicable song selection section 41 with information for designating a suitable range of the search axis in response to the user's operations.

The search axis acquisition section 37 acquires from the search axis database 33 the search axes to be used for search. Furthermore, the search axis acquisition section 37 acquires from another user's search axis database 38 the search axes which are for use in search and which have been created from the information about another user.

The search axis acquisition section 37 proceeds to supply the acquired search axes to the search axis value computation section 39.

Another user's search axis database 38 accommodates the search axes which serve as the references for presenting songs and which have been created from the information about another user. In other words, another user's search axis database 38 stores the regression equations or discriminants for computing the search axis values which serve as the references for presenting songs and which have been created from the information about another user.

For example, the communication section 46 may receive over the network 13 a search axis that has been sent from another song search apparatus 11 or from the server 12. In that case, the communication section 46 forwards the received search axis to another user's search axis database 38. In this manner, another user's search axis database 38 stores the search axes which came through the communication section 46 and which have been created from the information about another user. If the song search apparatus 11 is used by a plurality of users, then the search axis database 33 and another user's search axis database 38 accommodate the search axes that have been created separately from the information about the different users. That is, the search axis database 33 stores the search axes created from the information about the user currently using the song search apparatus 11; another user's search axis database 38 accommodates the search axes created from the information about another user who is different from the user currently using the apparatus 11.

Given a search axis from the search axis acquisition section 37, the search axis value computation section 39 computes the values of songs on that search axis based on the feature quantities of these songs supplied by the feature quantity database 32. The search axis value computation sect on 39, given another search axis from the search axis acquisition section 37, computes the values of songs on that search axis based on the feature quantities of these songs supplied by another user's feature quantity database 40.

The search axis value computation section 39 supplies the search axis values of the songs thus computed to the applicable song selection section 41 or to the display section 45.

Another user's feature quantity database 40 stores the feature quantities of the songs owned by another user. Illustratively, another user's feature quantity database 40 stores as feature quantities the metadata of the songs in another user's possession.

Another user's feature quantity database 40 typically stores the feature quantities of the songs owned by the user of another song search apparatus 11. Alternatively, if the song search apparatus 11 is used by a plurality of users, then another user's feature quantity database 40 may accommodate the feature quantities of the songs owned by a user who is different from the user currently using the song search apparatus 11.

More specifically, the communication section 46 may receive the feature quantities of the songs owned by another user following sending from another song search apparatus 11 or from the server 12 over the network 13. The communication section 46 then supplies the received feature quantities of another user's songs to another user's feature quantity database 40. In turn, another user's feature quantity database 40 stores the feature quantities of another user's songs following receipt from the communication section 46.

From the songs presented as contents, the applicable song selection section 41 selects the songs that fall into a predetermined range. For example, from the songs displayed for presentation on two search axes for reference, the applicable song selection section 41 may select the songs that fall into a predetermined range of these two reference search axes.

In another example, from the songs displayed for presentation on a search axis created for reference from the information about the user and on another search axis created for reference from the information about another user, the applicable song selection section 41 may select those songs that fall into a predetermined range of these search axes serving as the references for both this user and another user.

More specifically, the applicable song selection section 41 may select the songs of which the coordinate positions fall into a predetermined range which partially covers the search axes of interest and which is defined by information supplied by the operation section 36 in response to the user's operations.

The content reproduction section 42 reads from the content database 43 the songs selected as target contents by the applicable song selection section 41, and reproduces the retrieved songs for output.

The content database 43 stores the songs as the contents owned by the user. The songs stored in the content database 43 are typically associated with the feature quantities stored as metadata of the songs in the feature quantity database 32 through the use of ID information for identifying these songs.

From the search axis database 33, the search axis comparison section 44 acquires the search axes created from the information about the user; from another user's search axis database 38, the search axis comparison section 44 obtains the search axes created from the information about another user. The search axis comparison section 44 proceeds to compares the search axes created for the user with those for another user, illustratively to determine similarities therebetween.

More specifically, the search axis comparison section 44 may compute the similarity between two search axes, one created from the information about the user regarding given songs, the other axis derived from the information about another user regarding the same songs.

That is, the search axis comparison section 44 reads the metadata of the songs owned by the user from the feature quantity database 32. Based on the retrieved metadata of the songs in the user's possession, the search axis comparison section 44 computes the values of the songs of interest on the search axis created from the information about the user as well as on the search axis derived from the information about another user. The search axis comparison section 44 then computes the similarity between the values of the songs owned by the user on the search axis created from the information about the user on the one hand, and the values of the same songs on the search axis derived from the information about another user on the other hand; the similarity is indicative of how similar the search axis for the user is to the search axis for another user.

For example, the search axis comparison section 44 may compute the similarity between two given search axes. One of the search axes may be defined by the metadata of the songs as their feature quantities and by either the history of reproduction of the songs by the user or the evaluations of the songs by the user; the other search axis may be defined by the metadata of the songs and by either the history of reproduction of the songs by another user or the evaluations of the songs by another user.

The display section 45 is made up of an LCD (liquid crystal display) device, an organic EL (electroluminescence) display device or the like, and of a display control section for controlling the display device. Under control of the display control section, the display section 45 displays various images and characters. Illustratively, based on the search axis values of songs supplied by the search axis value computation section 39, the display section 45 controls display of the presentation of the songs on the search axes created as references from the information about the user as well as from the information about another user who is found similar in taste to the user.

In another example, when presenting songs, the display section 45 may display in overlapping fashion an image of the search axes created from the information about the user and an image of the search axes derived from the information about another user.

That is, the display section 45 controls display of the presentation of contents in reference to the search axes created by the search axis learning section 31. Alternatively, the display section 45 may control display of the presentation of contents in reference to the search axes similar to the user's.

The communication section 46 receives search axes (i.e., regression equations or discriminants) created from the information about another user and sent from another song search apparatus 11 or from the server 12 over the network 13, and supplies the received search axes to another user's search axis database 38. Furthermore, the communication section 46 receives the feature quantities of another user's contents sent from another song search apparatus 11 or from the server 12 over the network 13, and supplies the received another user's content feature quantities to another user's feature quantity database 40.

The communication section 46 may retrieve search axes of the user from the search axis database 33 and send the user's search axes thus retrieved to another song search apparatus 11 or to the server 12 over the network 13. The communication section 46 may also retrieve the feature quantities of the user's contents from the feature quantity database 32 and send the retrieved content feature quantities of the user to another song search apparatus 11 over the network 13.

As described, the song search apparatus 11 creates search axes which are for use in search and which have been personalized for each user. The song search apparatus 11 allows the search axes thus created to be shared by a plurality of users.

What follows is a description of how search axes are typically created.

The song search apparatus 11 may create the search axes for use in search either from the history of reproduction of songs by the user or from user-input feedback values of the songs.

For example, a search axis may provide the reference by which to determine whether or not songs are preferred by the user and/or to what degree each of the songs is preferred by the user. Another search axis may provide the reference for determining whether songs are reproduced frequently or infrequently and/or how high the frequency of reproduction is of each of the songs involved.

A further search axis may provide the reference by which to determine whether or not songs have been played recently by the user. An even further search axis may provide the reference for determining whether the songs are played on weekends or on workdays by the user. A still further search axis may provide the reference for determining whether the songs are played during the day or at night by the user.

Figures 3, 4:
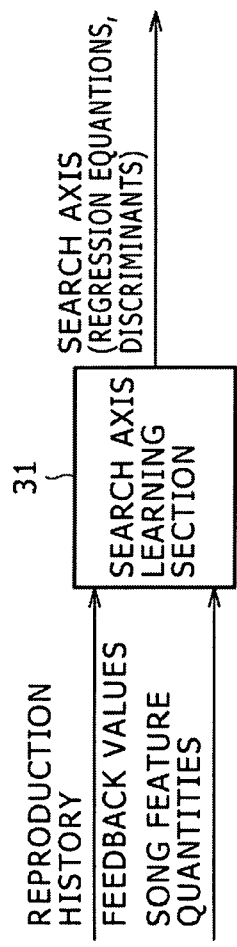
FIG. 3 is a schematic view explanatory of how a search axis learning section creates a search axis.
FIG. 4 is a tabular view showing typical feature quantities and feedback values of songs.

As shown in FIG. 3, the search axis learning section 31 creates a search axis through learning such as statistical analysis or machine learning based on the feature quantities of songs and either on the history of reproduction of the songs or on the feedback values of the songs, the search axis being defined as a regression equation or discriminants for estimating song feature quantities characteristic of the songs.

When the regression equation or discriminants of the search axis thus created are applied to the feature quantities of a given song, the search axis value of that song is computed. That means it is possible to compute search axis values for songs which have yet to be reproduced or of which the feedback values have yet to be input. The songs involved can thus be presented according to the values computed on the search axes.

Illustratively, it might happen that the user has so far reproduced only part of the songs in his or her possession or that feedback values have been input only for part of the songs. In such a case, it is still possible to obtain the search axis values of all songs owned by the user.

That is, even if some songs have never been reproduced or if their feedback values have yet to be input, the search axis values of these songs can still be acquired from their metadata by use of appropriate regression equations or discriminants.

FIG. 4 is a tabular view showing typical feature quantities and feedback values of songs on a scale of preference of one to five, for use in creating a search axis serving as the reference by which to determine how much each of the songs is preferred by the user. Typically, the song feature quantities may be furnished as metadata.

Illustratively, the user may operate the operation section 36 to input feedback values indicative of the preferences for songs on the scale of one to five. The feedback values represent the evaluations of the songs by the user. The feedback values are stored into the reproduction history feedback database 35 as described above.

In the example of FIG. 4, the feedback value of preference for song 1 is "5," which means "highly liked." The feedback value of preference for song 2 is "3," which means "neither liked nor disliked." The feedback value of preference for song 3 is "2," which means "rather disliked."

In the example of FIG. 4, the feature quantities 1, 2, and 3 for song 1 are 24, 74, and 68 respectively; the feature quantities 1, 2, and 3 for song 2 are 17, 81, and 50 respectively; and the feature quantities 1, 2 and 3 for song 3 are 33, 75, and 97 respectively.

The search axis learning section 31 may learn regression equations based on the feedback values of preference illustratively for the songs in FIG. 4 and on the feature quantities of these songs.

The regression equations may be learned through the use of linear regression (multiple regression analysis) or SVR (support vector regression).

The learning process provides the regression equations for computing search axis values indicative of the degrees of preference for songs. A regression equation may be typically given as follows: F (feature quantity)=feature quantity 1×0.5+feature quantity 2×0.2−feature quantity 3×0.9+ . . . , 0.3. When the regression equation above is applied to the feature quantities of a given song, it is possible to obtain the search axis value representative of the degree of preference for the song in question.

Figure 5:
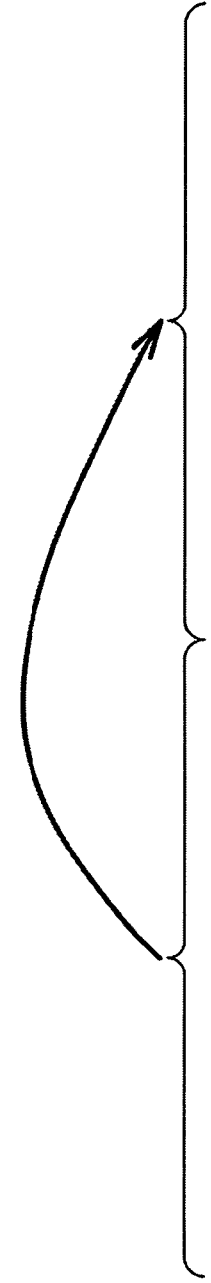
FIG. 5 is another tabular view showing typical feature quantities and feedback values of songs.

FIG. 5 is another tabular view listing typical feature quantities and feedback values of songs on a binary scale of preference of "liked" or "disliked," for use in creating a search axis serving as the reference by which to determine whether or not each of the songs is preferred by the user.

Illustratively, the user may operate the operation section 36 to input the feedback value for each song indicating whether the song in question is liked or not.

In the example of FIG. 5, the feedback value for each song is binary, which means either the song is liked or disliked.

As shown illustratively in FIG. 5, the feedback value for song 1 is "liked"; the feedback value for song 2 is "liked"; and the feedback value for song 3 is "disliked."

Also in the example of FIG. 5, the feature quantities 1, 2, and 3 for song 1 are 24, 74, and 68 respectively; the feature quantities 1, 2, and 3 for song 2 are 17, 81, and 50 respectively; and the feature quantities 1, 2, and 3 for song 3 are 33, 75, and 97 respectively.

The search axis learning section 31 may learn discriminants based on the feedback values of preference illustratively for the songs in FIG. 5 and on the feature quantities of these songs.

The discriminants may be learned through the use of linear discriminant analysis, decision tree analysis, SVM (support vector machine), or naïe Bayes.

Illustratively, linear discriminant analysis provides the discriminants defining the search axis serving as the reference for determining whether each given song is liked or disliked by the user. Discriminants may be typically given as follows: F (feature quantity)=feature quantity 1×0.5+feature quantity 2×0.2−feature quantity 3×0.9+ . . . , 0.3. Illustratively, if the value F (feature quantity) thus obtained for a given song is equal to or larger than 0.0, then the song in question is deemed liked; if the value F is less than 0.0, then the song in question is deemed disliked. When the discriminants above are applied to the feature quantities of songs, it is possible to obtain the search axis value indicative of whether each of the songs is liked or disliked by the user.

For example, the regression equation or discriminants may be learned through the use of metadata representative of the feature quantities of the songs involved. The regression equation or discriminants thus learned may be used to compute the search axis values of the songs based on their metadata.

At the song search apparatus 11, the user may create a desired search axis by inputting the name of the new search axis and the feedback values of several songs indicative of the degree to which each of the songs applies to the axis or whether or not each song is applicable at all to the axis in question.

It should be noted that each regression equation and discriminant may be either linear or nonlinear.

What follows is a description of how a search is made for songs by use of search axes.

To search for songs using a created search axis involves initially computing the values of all songs owned by the user on all search axes.

Figure 6:
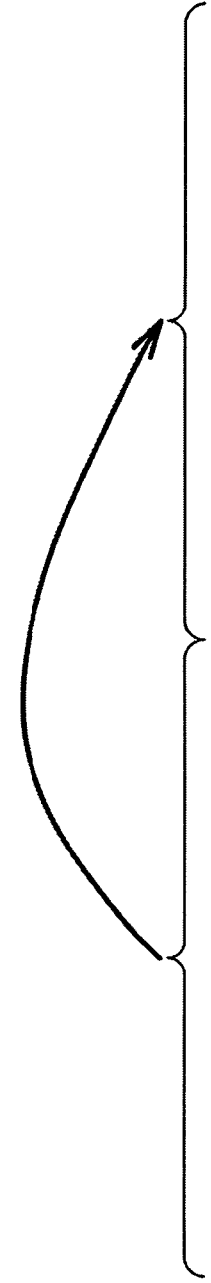
FIG. 6 is a tabular view explanatory of how search axis values are computed.

For example, as shown in FIG. 6, the regression equation defining the search axis of "preference" is first applied to the feature quantities 1, 2, and 3 of 24, 74, and 68 respectively for song 1, whereby the value of song 1 on that search axis is computed to be 0.3. The regression equation defining the search axis of "songs played frequently" is then applied to the same feature quantities 1, 2, and 3 for song 1, whereby the value of song 1 on that search axis is computed to be 0.2. The regression equation defining the search axis of "songs played in the morning" is also applied to the same feature quantities 1, 2, and 3 for song 1, whereby the value of song 1 on that search axis is computed to be 0.1.

Also in the example of FIG. 6, the regression equation defining the search axis of "preference" is applied to the feature quantities 1, 2, and 3 of 17, 81, and 50 respectively for song 2, whereby the value of song 2 on that search axis is computed to be 0.8. The regression equation defining the search axis of "songs played frequently" is then applied to the same feature quantities 1, 2, and 3 for song 2, whereby the value of song 2 on that search axis is computed to be 0.9. The regression equation defining the search axis of "songs played in the morning" is further applied to the same feature quantities 1, 2, and 3 for song 2, whereby the value of song 2 on that search axis is computed to be 0.7.

As shown further in FIG. 6, the regression equation defining the search axis of "preference" is applied to the feature quantities 1, 2, and 3 of 33, 75, and 97 respectively for song 3, whereby the value of song 3 on that search axis is computed to be 0.4. The regression equation defining the search axis of "songs played frequently" is then applied to the same feature quantities 1, 2, and 3 for song 3, whereby the value of song 3 on that search axis is computed to be 0.3. The regression equation defining the search axis of "songs played in the morning" is further applied to the same feature quantities 1, 2, and 3 for song 3, whereby the value of song 3 on that search axis is computed to be 0.1.

Based on the value of each of the songs on each of the search axes involved, it is possible to search for songs that meet a particular search condition described in search axis values. For example, a search can be made for songs that will meet the condition that the value on the search axis of "preference" be 0.5 or larger, that the value on the search axis of "songs played frequently" be 0.4 or less, and that the value on the search axis of "songs played in the morning" be 0.2 or larger.

In another example, as shown in FIG. 7, the discriminants defining the search axis of "preference" are applied to the feature quantities 1, 2, and 3 of 24, 74, and 68 respectively for song 1, whereby song 1 on that search axis is found to be preferred by the user (i.e., "liked"). The discriminants defining the search axis of "songs played frequently" are then applied to the same feature quantities 1, 2, and 3 for song 1, whereby song 1 on that search axis is found to be played frequently by the user (i.e., "yes"). The discriminants defining the search axis of "songs played in the morning" are further applied to the same feature quantities 1, 2, and 3 for song 1, whereby song 1 on that search axis is not found to be played in the morning by the user (i.e., "no").

If the user wants to search for songs to his or her taste, then the song search apparatus 11 searches for the songs of which the values on the search axis of "preference" are found to be "liked," and presents the songs thus detected to the user.

As shown also in FIG. 7, the discriminants defining the search axis of "preference" are applied to the feature quantities 1, 2, and 3 of 17, 81, and 50 respectively for song 2, whereby song 2 on that search axis is found to be preferred by the user (i.e., "liked"). The discriminants defining the search axis of "songs played frequently" are then applied to the same feature quantities 1, 2, and 3 for song 2, whereby song 2 on that search axis is found to be played frequently by the user (i.e., "yes"). The discriminants defining the search axis of "songs played in the morning" are further applied to the same feature quantities 1, 2, and 3 for song 2, whereby song 2 on that search axis is found to be played in the morning by the user (i.e., "yes").

Also in the example of FIG. 7, the discriminants defining the search axis of "preference" are applied to the feature quantities 1, 2, and 3 of 33, 75, and 97 respectively for song 3, whereby song 3 on that search axis is not found to be preferred by the user (i.e., "disliked"). The discriminants defining the search axis of "songs played frequently" are then applied to the same feature quantities 1, 2, and 3 for song 3, whereby song 3 on that search axis is not found to be played frequently by the user (i.e., "no"). The discriminants defining the search axis of "songs played in the morning" are further applied to the same feature quantities 1, 2, and 3 for song 3, whereby song 3 on that search axis is not found to be played in the morning by the user (i.e., "no").

Also in the above example, based on the value of each of the songs on each of the search axes involved, it is possible to search for songs that meet a particular search condition described in search axis values. That is, a search can be made for songs that meet or do not meet certain search conditions regarding specific search axes.

For example, a search can be made for songs that will (or are expected to) meet the search condition that songs be "liked" by the user on the search axis of "preference." In another example, a search can be made for songs that will meet the search condition that songs not be played frequently by the user (i.e., "no") on the search axis of "songs played frequently."

Figure 8:
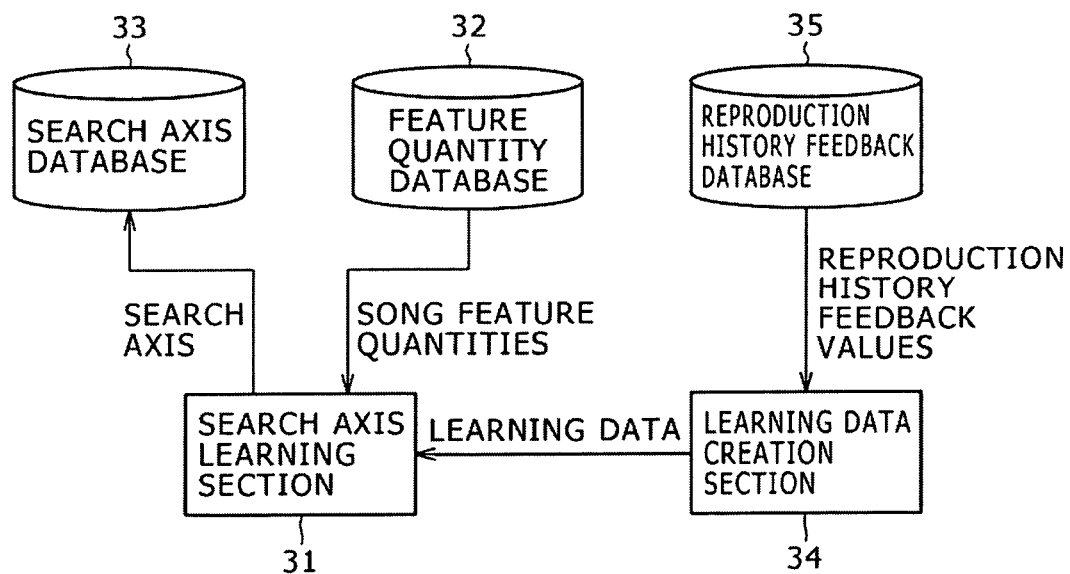
FIG. 8 is a block diagram showing a typical structure for learning search axes.

FIG. 8 is a block diagram showing a typical structure as part of the setup in FIG. 2 for learning search axes.

As shown in FIG. 8, when learning a search axis, the learning data creation section 34 first acquires either the history of reproduction of songs by the user or feedback values as the evaluations of the songs by the user from the reproduction history feedback database 35.

The learning data creation section 34 creates learning data by removing the data unnecessary for the learning of the search axis to be created, from either the history of reproduction of the songs by the user or the feedback values as the evaluations of the songs by the user.

How learning data is created will now be described by referring to FIGS. 9 through 12.

FIG. 9 is a schematic view showing a typical history of reproduction of songs by the user. The history (i.e., of data) of reproduction of the songs by the user indicates the dates and times on which the user reproduced certain songs and performed reproduction-related operations on other songs in the past.

For example, according to the typical history of reproduction of songs by the user shown in FIG. 9, song 1 was reproduced at 14:04 on Sep. 7, 2006; song 2 was reproduced at 14:08 on Sep. 7, 2006; song 3 was reproduced at 14:13 on Sep. 7, 2006; song 3 was then skipped at 14:15 on Sep. 7, 2006; song 4 was reproduced at 14:15 on Sep. 7, 2006; and song 4 was stopped at 14:18 on Sep. 7, 2006.

FIG. 10 is a schematic view showing typical feedback values as evaluations of songs by the user. The feedback values signify explicit feedback made by the user regarding the songs involved. That is, a feedback value is an explicit evaluation of a given song by the user.

Of the categories of feedback shown in the example of FIG. 10, those of "interest," "for parents" and "old" are established personally by the user. According to the feedback values in the category of "preference" in FIG. 10, song 1 is given "5" which means "highly liked"; song 2 is given "3" which means "neither liked nor disliked"; song 4 is given "1" which means "highly disliked"; song 5 is given "5" which means "highly liked"; and song 6 is given "4" which means "rather liked." In the example of FIG. 10, no feedback value of the "preference" category has been input with regard to song 3.

According to the feedback values in the category of "interest" in FIG. 10, song 1 is given "3" which means "fairly interesting"; song 2 is given "1" which means "utterly uninteresting"; song 3 is given "5" which means "highly interesting"; and song 6 is given "4" which means "interesting."

In the example of FIG. 10, no feedback value of the "interest" category has been input regarding song 4 and song 5.

According to the feedback values in the category of "for parents" in FIG. 10, song 1 is given "1" which means that the song is utterly inappropriate for the parents; song 2 is given "2" which means that the song is rather inappropriate for the parents; song 4 is given "5" which means that the song is appropriate for the parents; and song 5 is given "1" which again means that the song is utterly inappropriate for the parents.

In the example of FIG. 10, no feedback value of the "for parents" category has been input with regard to song 3 and song 6.

According to the feedback values in the category of "old" in FIG. 10, song 2 is given "3" which means that the song is fairly old; song 3 is given "1" which means that the song is not at all old; song 4 is given "3" which again means that the song is fairly old; and song 6 is given "2" which means that the song is a little old.

In the example of FIG. 10, no feedback value of the "old" category has been input regarding song 1 and song 5.

Illustratively, the learning data creation section 34 creates learning data either from the history of reproduction of songs by the user such as one shown in FIG. 9, or from feedback values regarding the songs such as those shown in FIG. 10.

FIG. 11 is a schematic view showing typical learning data created by the learning data creation section 34.

The learning data is data for learning a regression equation or discriminants defining a search axis. Illustratively, the learning data is constituted by song IDs for identifying songs and by solution data associated with the songs in list form.

According to the typical learning data shown in list form in FIG. 11, the song ID of song 1 is associated with the solution data of "5"; the song ID of song 3 is associated with the solution data of "4"; the song ID of song 6 is associated with the solution data of "2"; the song ID of song 12 is associated with the solution data of "3"; and the song ID of song 16 is associated with the solution data of "1."

In the typical learning data in FIG. 11, the solution data denotes the user's preference in degrees as well as for the user's graduated perceptions in the "interest," "for parents" and "old" categories with regard to the songs identified by the corresponding song IDs.

More specifically, under the category of "preference," the solution data of "5" means that the song identified by the associated song ID is highly liked by the user; the solution data of "4" means that the song identified by the associated song ID is rather liked by the user; the solution data of "3" means that the song identified by the associated song ID is neither liked nor disliked by the user; the solution data of "2" means that the song identified by the associated song ID is rather disliked by the user; and the solution data of "1" means that the song identified by the associated song ID is highly disliked by the user.

Illustratively, the learning data creation section 34 extracts the feedback values of one category as well as the corresponding song IDs from the feedback values shown in FIG. 10. From the extracted results, the learning data creation section 34 removes the song IDs with which no feedback value is associated. The learning data creation section 34 then creates learning data by regarding the feedback values corresponding to the song IDs as the solution data.

Figure 12:
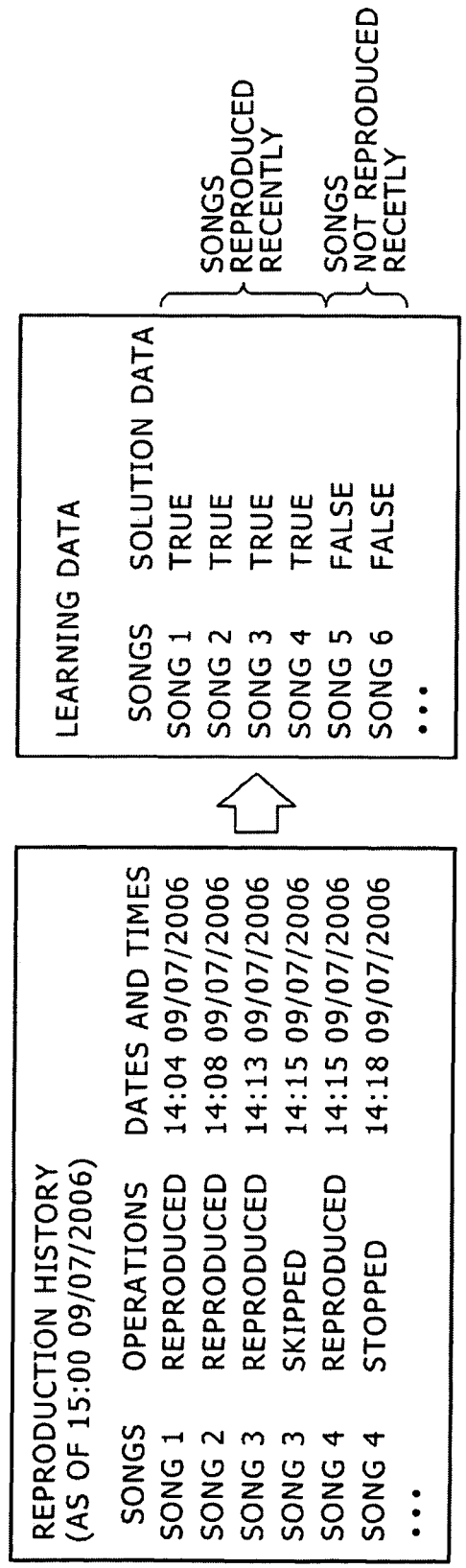
FIG. 12 is a schematic view explanatory of how learning data is created from a history of reproduction of songs by the user.

FIG. 12 is a schematic view explanatory of how learning data is created from a history of reproduction of songs by the user.

From such a history of reproduction of songs by the user, the learning data creation section 34 creates learning data in the form of a list constituted by song IDs for identifying the songs involved and by solution data for indicating whether or not each of the identified songs was reproduced recently.

According to the typical history of reproduction as of 15:00 on Sep. 7, 2006 shown in FIG. 12, song 1 was reproduced at 14:04 on Sep. 7, 2006; song 2 was reproduced at 14:08 on Sep. 7, 2006; song 3 was reproduced at 14:13 on Sep. 7, 2006; song 3 was then skipped at 14:15 on Sep. 7, 2006; song 4 was reproduced at 14:15 on Sep. 7, 2006; and song 4 was stopped at 14:18 on Sep. 7, 2006. From this history, the learning data creation section 34 creates a list of learning data wherein song 1 identified by the corresponding song ID is associated with the resolution data of "True" which means that song 1 was reproduced recently; song 2 identified by the corresponding song ID is associated with the resolution data of "True" which means that song 2 was reproduced recently; song 3 identified by the corresponding song ID is associated with the resolution data of "True" which means that song 3 was reproduced recently; song 4 identified by the corresponding song ID is associated with the resolution data of "True" which means that song 4 was reproduced recently; song 5 identified by the corresponding song ID is associated with the resolution data of "False" which means that song 5 was not reproduced recently; and song 6 identified by the corresponding song ID is associated with the resolution data of "False" which means that song 6 was not reproduced recently.

The learning data shown in FIG. 12 is created illustratively upon creation of a search axis serving as the reference by which to determine whether or not given songs were reproduced recently.

Returning to FIG. 8, the learning data creation section 34 creates learning data of the above kind and supplies the created learning data to the search axis learning section 31 as indicated.

The search axis learning section 31 acquires the feature quantities of each of the songs involved from the feature quantity database 32 and proceeds to learn a regression equation or discriminants defining a search axis based on the learning data and on the song feature quantities.

Figure 13:
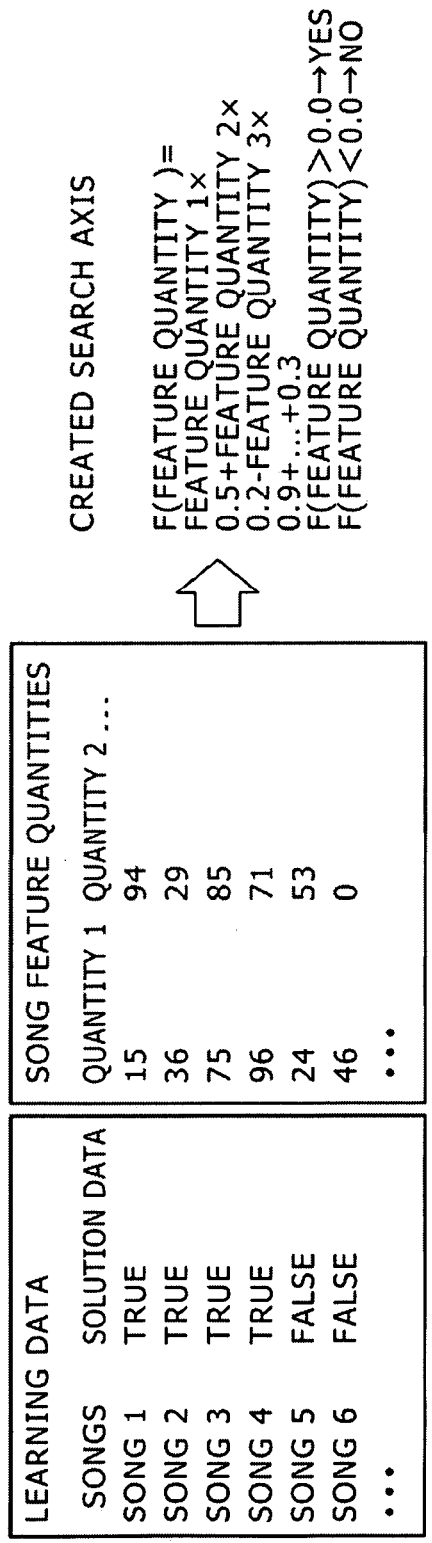
FIG. 13 is a schematic view explanatory of how discriminants of a search axis are computed.

For example, as indicated in FIG. 13, the search axis learning section 31 learns discriminants (1), (2) and (3) shown later based at least on a list of learning data and on song feature quantities given as follows: According to the list of learning data, song 1 identified by the corresponding song ID is associated with the solution data of "True" which means that song 1 is liked by the user; song 2 identified by the corresponding song ID is associated with the solution data of "True" which means that song 2 is liked by the user; song 3 identified by the corresponding song ID is associated with the solution data of "True" which means that song 3 is liked by the user; song 4 identified by the corresponding song ID is associated with the solution data of "True" which means that song 4 is liked by the user; song 5 identified by the corresponding song ID is associated with the solution data of "False" which means that song 5 is disliked by the user; and song 6 identified by the corresponding song ID is associated with the solution data of "False" which means that song 6 is disliked by the user. According to the feature song quantities, the song feature quantities for song 1 include the song quantities 1 and 2 of 15 and 94 respectively; the song feature quantities for song 2 include the song quantities 1 and 2 of 36 and 29 respectively; the song feature quantities for song 3 include the song quantities 1 and 2 of 75 and 85 respectively; the song feature quantities for song 4 include the song quantities 1 and 2 of 96 and 71 respectively; the song feature quantities for song 5 include the song quantities 1 and 2 of 24 and 53 respectively; and the song feature quantities for song 6 include the song quantities 1 and 2 of 46 and 0 respectively. The three discriminants learned from the above learning data and song feature quantities are as follows:

$$F(\text{song feature quantity}) = \text{feature quantity } 1 \times 0.5 + \text{feature quantity } 2\ 1 \times 0.2 - \text{feature quantity } 3 \times 0.9 + \ldots, +0.3 \quad (1)$$

$$F(\text{song feature quantity}) \geq 0.0 \rightarrow \text{Yes} \quad (2)$$

$$F(\text{song feature quantity}) < 0.0 \rightarrow \text{No} \quad (3)$$

The discriminant (2) above indicates that if the value F (song feature quantity) obtained by the discriminant (1) is equal to or larger than 0.0, then the song in question is deemed liked by the user. The discriminant (3) above shows that if the value F (song feature quantity) obtained by the discriminant (1) is less than 0.0, then the song in question is deemed disliked by the user.

As described above, the search axis learning section 31 may create a search axis by obtaining through learning a regression equation for computing search axis values from feature quantities of the songs involved, based on the song feature quantities and either on the history of reproduction of the songs by the user or on the evaluations of these songs by the user. Alternatively, the search axis learning section 31 may create a search axis by obtaining through learning discriminants for computing search axis values from feature quantities of the songs involved, based on the song feature quantities and either on the history of reproduction of the songs by the user or on the evaluations of these songs by the user.

The search axis learning section 31 supplies the search axis thus created to the search axis database 33. In turn, the search axis database 33 stores the search axis supplied by the search axis learning section 31. That is, the search axis learning section 31 supplies created regression equations or discriminants to the search axis database 33, and the search axis database 33 accommodates such regression equations or discriminants that have been received.

Figure 14:
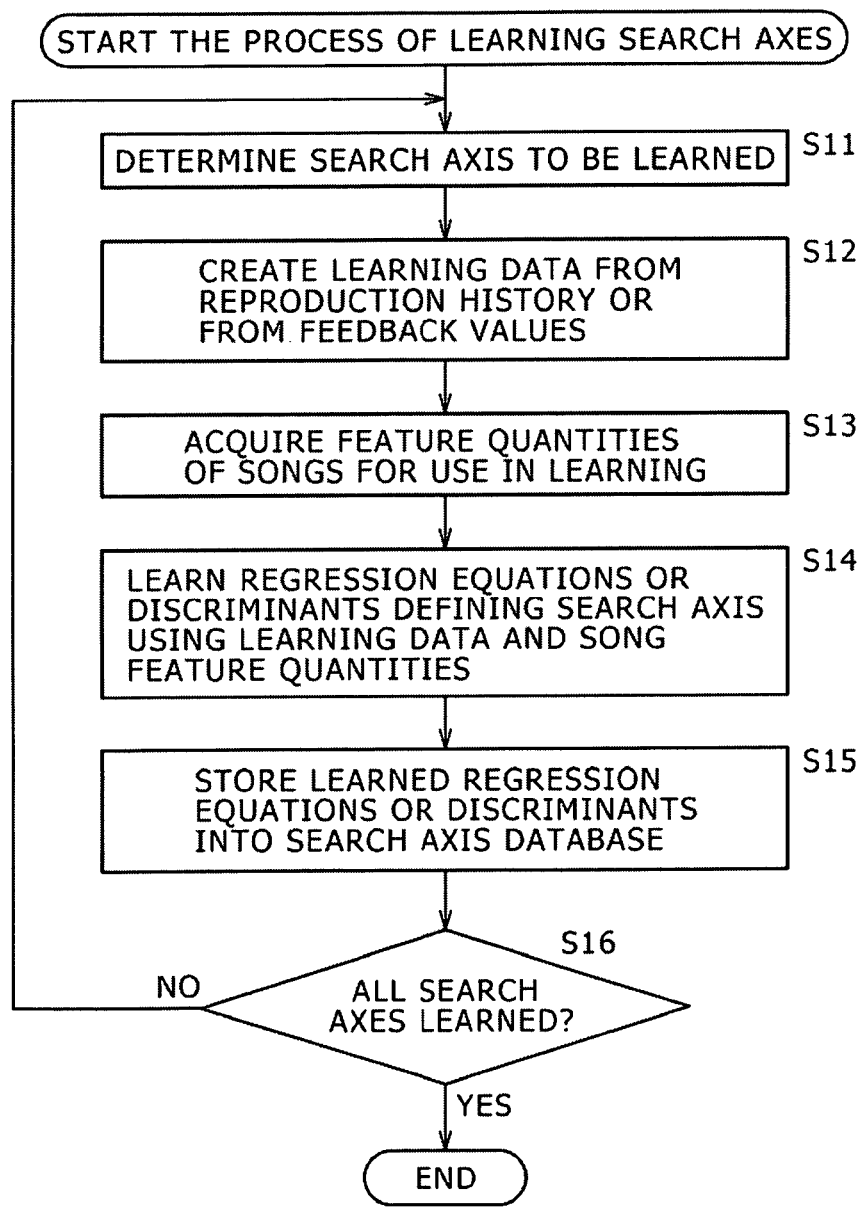
FIG. 14 is a flowchart of steps constituting a typical process of learning search axes.

FIG. 14 is a flowchart of steps constituting a typical process of learning search axes. In step S11, the search axis learning section 31 determines the search axis to be learned. Illustratively, the search axis learning section 31 may decide on the search axis designated by a signal supplied from the operation section 36 reflecting the user's operations, as the search axis to be learned.

In step S12, the learning data creation section 34 creates learning data either from a history of reproduction of the songs involved by the user or from feedback values representing the evaluations of these songs by the user. Typically, the learning data creation section 34 acquires the history of reproduction of the songs by the user or the feedback values from the reproduction history feedback database 35. From the history of reproduction of the songs by the user or from the feedback values, the learning data creation section 34 creates learning data made up of the song IDs for identifying the songs involved and of the solution data corresponding to these songs.

In step S13, the search axis learning section 31 acquires the feature quantities of the songs for use in learning from the feature quantity database 32.

In step S14, based on the learning data and song feature quantities, the search axis learning section 31 learns the regression equation or discriminants defining the search axis determined in step S11. Illustratively, the search axis learning section 31 may learn the discriminants through the use of linear discriminant analysis, decision tree analysis, SVM (support vector machine), or naïe Bayes. Alternatively, the search axis learning section 31 may learn the regression equation through the use of linear regression (multiple regression analysis) or SVR (support vector regression).

In step S15, the search axis learning section 31 stores the regression equation or discriminants thus learned into the search axis database 33.

In step S16, the search axis learning section 31 checks to determine whether all search axes have been learned. If all search axes have yet to be learned, then control is returned to step S11 and the subsequent steps are repeated.

If in step S6 all search axes are found to have been learned, then the process of learning search axes is brought to an end.

This is how the song search apparatus 11 learns the axes serving as the references by which to present contents.

That is, the song search apparatus 11 can learn search axes which serve as the references for presenting contents and which have been created from user-related information. The song search apparatus 11 can further create search axes which serve as the references for presenting the contents and which are defined by the feature quantities of the contents and by either the history of reproduction of the contents by the user or the evaluations of the contents by the user.

What follows is a description of how songs are searched for through the use of search axes.

Figure 15:
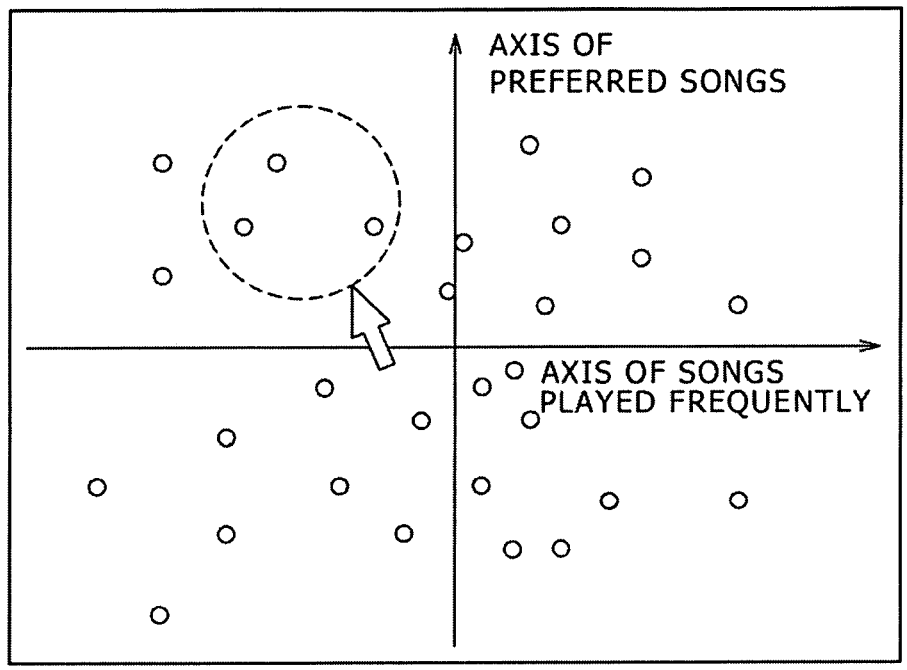
FIG. 15 is a schematic view explanatory of a user interface that maps songs in a space defined by search axes.

As shown in FIG. 15, a space may be formed by at least two dimensions represented by the search axes defined by regression equations. Mapped with songs, that space may be offered as a user interface through which intuitive searches can be made for the songs. In this case, to map the space with songs means to compute the values of each of the songs on the search axes so as to determine the spatial positions of these songs in a manner reflecting the computed values. In the space thus displayed, the positions of the songs may be represented by suitable images such as circles or crosses.

In the manner described above, the user is able to recognize at a glance the songs as they are presented on at least two search axes.

Illustratively, when a range is designated in the displayed space, a search is made for the songs of which the search axis values will fall into the designated range. More specifically, a range may be set to cover the songs which are "liked" on the search axis of "preference" and which are "not played frequently" on the search axis of "songs played frequently." With the range thus established, a search is made for the songs that are not played frequently but are liked by the user.

Furthermore, the song search apparatus 11 can search for songs based not only on the user's search axes created from the history of reproduction of songs by the user or from the user's feedback values of the songs, but also on another user's search axes.

For example, the song search apparatus 11 can search for the songs which are "liked" by the user as well as by another user "A." In another example, the song search apparatus 11 can search for the songs which are "played in the morning" by another user "A." In a further example, the song search apparatus 11 can search for the songs which are "liked" by the user and which are "played on weekends" by another user "B."

From the above and other examples, the user is able to know to what degree the user's likes and dislikes are similar to and different from those of other users.

Figure 16:
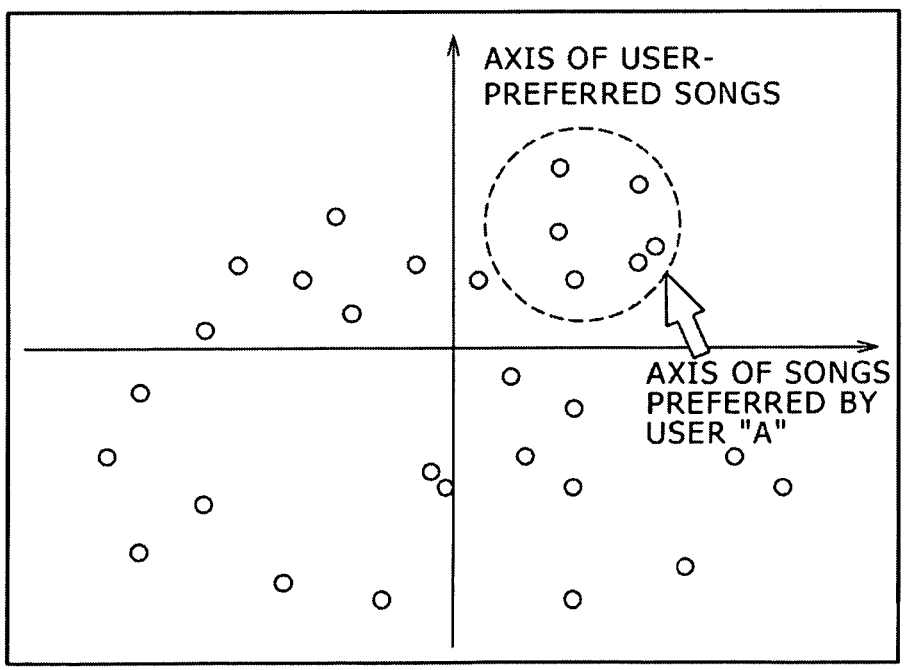
FIG. 16 is a schematic view explanatory of user interface that maps songs in a space defined by search axes including one created from another user's information.

In these cases, as shown in FIG. 16, the songs are mapped in the space established by the search axes that are defined by regression equations and created from the information about other users.

Illustratively, songs are mapped in a space determined by two search axes for two dimensions, one axis representing the preference of the user in degrees and the other axis denoting the preference of another user "A" in degrees. In this case, if a range is set to cover the songs that are "liked" by the user on his or her search axis of "preference" as well as by another user "A" on another user's search axis of "preference," then a search will be made for the songs preferred by the two users.

Figure 17:
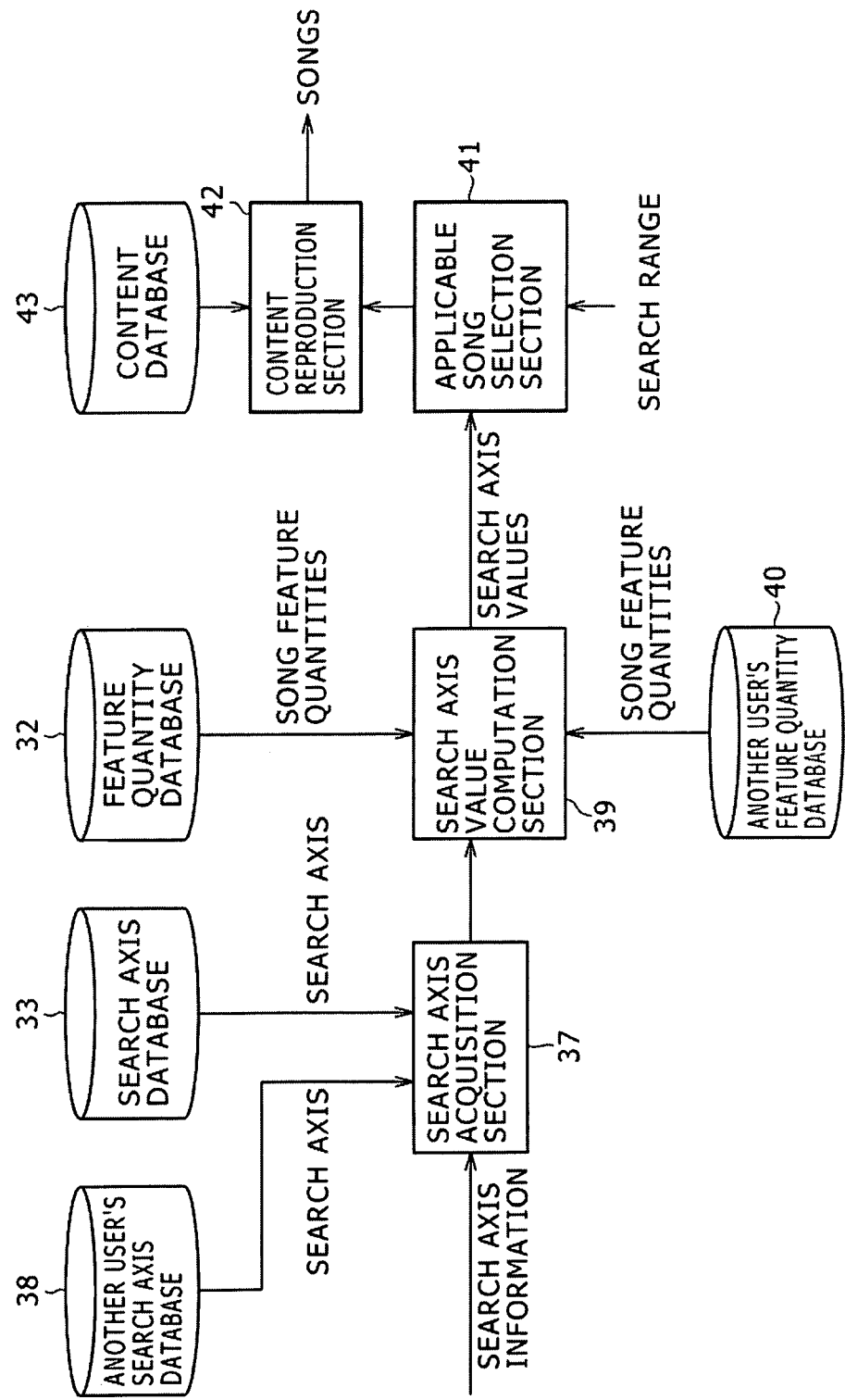
FIG. 17 is a block diagram showing a typical structure for making searches using search axes.

FIG. 17 is a block diagram showing a typical structure as part of the setup in FIG. 2 for making searches using search axes.

When making a search using search axes, the user operates the operation section 36 to designate the search axes to be used for the search. In response to the user's operations, the operation section 36 supplies the search axis acquisition section 37 with search axis information designating the target search axes to be used. As shown in FIG. 17, the search axis acquisition section 37 acquires the search axes designated by the search axis information from the search axis database 33 or from another user's search axis database 38.

Figure 18:
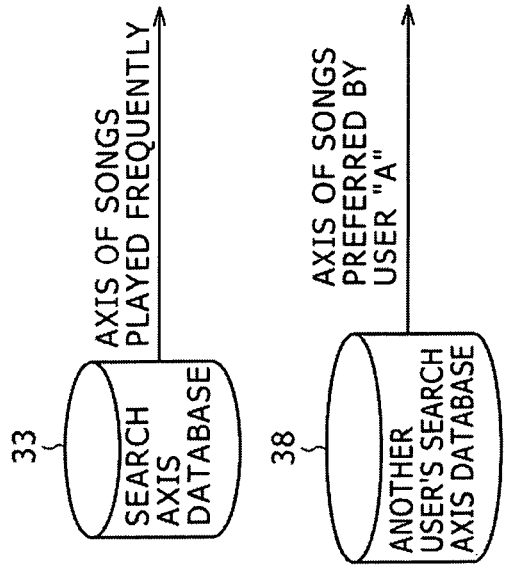
FIG. 18 is a schematic view explanatory of how search axes are acquired.

For example, suppose that the operation section 36 has supplied the search axis information denoting the search axes of "songs played frequently" and of "songs preferred by user 'A'." In such a case, the search axis acquisition section 37 acquires the search axis of "songs played frequently" (shown in FIG. 18) from the search axis database 33 and the search axis of "songs preferred by user 'A'" (also shown in FIG. 18) from another user's search axis database 38.

More specifically, in the above case, the search axis acquisition section 37 acquires the regression equation defining the search axis of "songs played frequently" from the search axis database 33, and the regression equation defining the search axis of "songs preferred by user 'A'" from another user's search axis database 38.

The search axis acquisition section 37 supplies the acquired search axes to the search axis value computation section 39.

The search axis value computation section 39 acquires the feature quantities of the user's songs from the feature quantity database 32 and the feature quantities of another user's songs from another user's feature quantity database 40.

Based on the song feature quantities thus acquired, the search axis value computation section 39 computes the values of the songs involved on the search axes supplied from the search axis acquisition section 37.

Figure 19:
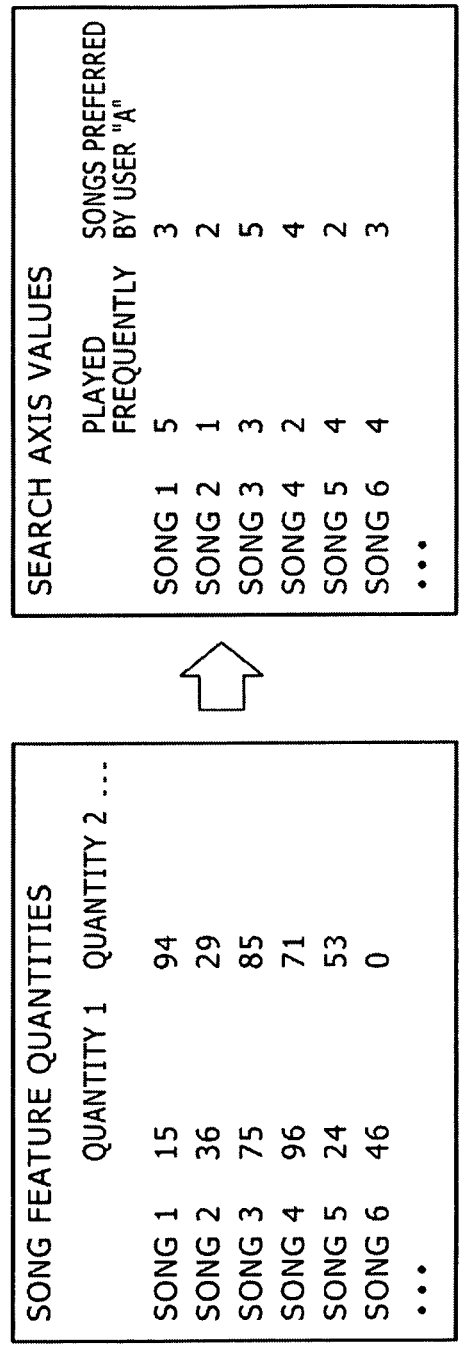
FIG. 19 is a schematic view explanatory of how search axis values are computed.

As shown illustratively in FIG. 19, the search axis value computation section 39 applies the regression equation defining the search axis of "songs played frequently" as well as the regression equation defining the search axis of "songs preferred by user 'A'" to the feature quantities of song including the feature quantities 1 and 2 of 15 and 94 respectively. The application of the equations makes it possible to compute, with regard to song 1, the value of 5 on the search axis of "songs played frequently" and the value of 3 on the search axis of "songs preferred by user 'A'."

Likewise, the search axis value computation section 39 applies the regression equation defining the search axis of "songs played frequently" as well as the regression equation defining the search axis of "songs preferred by user 'A'" to the feature quantities of song 2 including the feature quantities 1 and 2 of 36 and 29 respectively. The application of the equations makes it possible to compute, regarding song 2, the value of 1 on the search axis of "songs played frequently" and the value of 2 on the search axis of "songs preferred by user 'A'."

Similarly, the search axis value computation section 39 proceeds to apply the regression equation defining the search axis of "songs played frequently" as well as the regression equation defining the search axis of "songs preferred by user 'A'" to the feature quantities of each of song 3 through song 6. The application of the equations makes it possible to compute the values for each of song 3 through song 6 on the search axis of "songs played frequently" and on the search axis of "songs preferred by user 'A'."

The search axis value computation section 39 supplies the applicable song selection section 41 with the search axis values thus computed regarding the songs involved.

The applicable song selection section 41 selects the songs which meet the search condition from the search axis values for each song.

Figure 20:
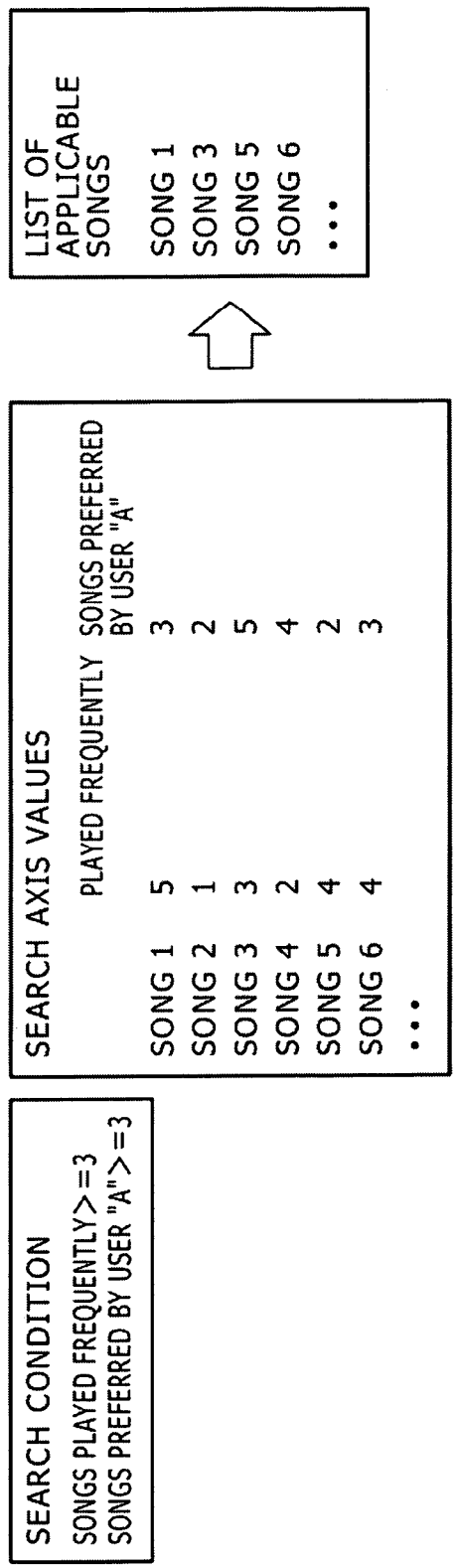
FIG. 20 is a schematic view explanatory of how songs are selected.

As shown illustratively in FIG. 20, it may be assumed that song 1 through song 6 are assigned the values of 5, 1, 3, 2, 4, and 4 respectively on the search axis of "songs played frequently" and are given the values of 3, 2, 5, 4, 2, and 3 respectively on the search axis of "songs preferred by user 'A'." Supplied with these search axis values of the songs involved, the applicable song selection section 41 may receive from the operation section 36 the search condition demanding that songs be selected if their values are at least 3 on the search axis of "songs played frequently" as well as on the search axis of "songs preferred by user 'A'." In that case, the applicable song selection section 41 selects song 1, song 3, song 5, and song 6 which meet the search condition.

The applicable song selection section 41 outputs an applicable song list indicating the selected songs to the content reproduction section 42. For example, the applicable song selection section 41 outputs the applicable song list in the form of a play list designating the songs to be reproduced.

The content reproduction section 42 reads from the content database 43 the songs listed in the applicable song list supplied from the applicable song selection section 41. The songs thus retrieved are reproduced and output.

Figure 21:
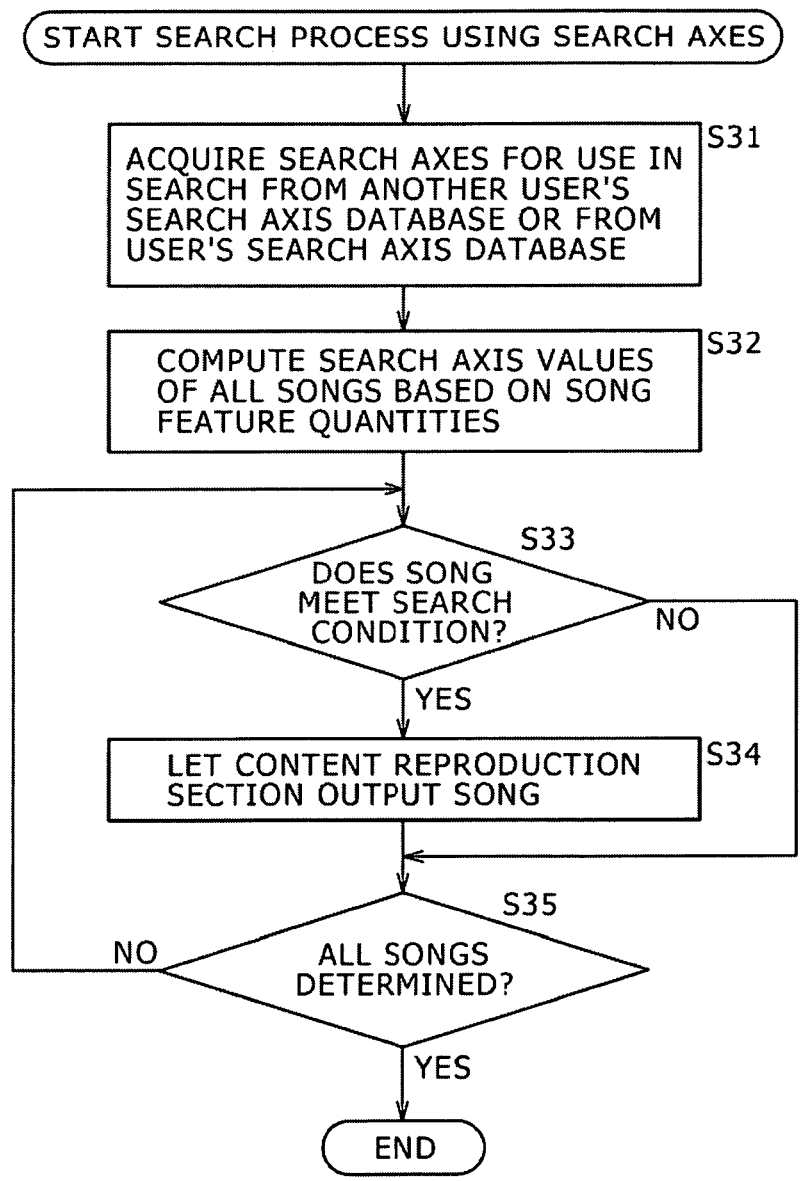
FIG. 21 is a flowchart of steps constituting a typical search process that uses search axes.

FIG. 21 is a flowchart of steps constituting a typical search process that uses search axes. In step S31, the search axis acquisition section 37 acquires the search axes for use in search from the search axis database 33 or from another user's search axis database 38. Illustratively, the search axis acquisition section 37 may acquire from the search axis database 33 or from another user's search axis database 38 the regression equation or discriminants designated by the search axis information coming from the operation section 36.

More specifically, in step S31, the search axis acquisition section 37 may acquire one search axis for search from the search axis database 33 and another search axis from another user's search axis database 38.

In step S32, the search axis value computation section 39 acquires the feature quantities of the user's songs from the feature quantity database 32 and the feature quantities of another user's songs from another user's feature quantity database 40, and computes the search axis values of all songs based on the acquired feature quantities. Illustratively, the search axis value computation section 39 may compute the values of the songs on the search axes for search by applying the regression equation or discriminants defining the search axes in question to the acquired feature quantities of the songs involved.

More specifically, after acquiring in step S31 one of the two search axes to be used for search from the search axis database 33 and the other search axis from another user's search axis database 38, the search axis acquisition section 37 in step S32 may proceed to obtain the feature quantities of only the user's songs from the feature quantity database 32. Based on the song feature quantities thus obtained, the search axis acquisition section 37 may compute the search axis values of all songs. This makes it possible for the user to know the values of his or her songs on the user's own search axis as well as on another user's search axis.

Conversely, after acquiring in step S31 one of the two search axes for search from the search axis database 33 and the other search axis from another user's search axis database 38, the search axis value computation section 39 in step S32 may obtain only the feature quantities of another user's songs from another user's feature quantity database 40. The search axis value computation section 39 may then compute the search axis values of all songs based on the song feature quantities thus obtained. This allows the user to know the values of another user's songs on the user's own search axis as well as on another user's search axis.

In step S33, the applicable song selection section 41 checks to determine whether one of the songs meets the search condition in place based on the search axis values for the search.

If in step S33 the song in question is found to meet the search condition, then control is passed on to step S34. In step S34, the applicable song selection section 41 causes the content reproduction section 42 to reproduce and output the song deemed applicable to the search condition.

Control is then transferred to step S35. The content reproduction section 42 in step S34 reads the song found to meet the search condition from the content database 43 and reproduces the retrieved song for output.

If the song checked for applicability to the search condition turns out to be another user's song, then reproduction of the song in question is skipped. In this case, the preview data of another user's song may be acquired illustratively from the server 12 over the network 13 to be reproduced as the song of interest.

If in step S33 the song in question is not found to met the search condition, then step S34 is skipped, and control is then passed on to step S35.

In step S35, the applicable song selection section 41 checks to determine whether all songs have been checked. If all songs have yet to be checked, then step S33 is reached again and the subsequent steps are repeated regarding the next song.

If in step S35 all songs are found to have been checked, then the search process using the search axes is brought to an end.

In another example, similarities may be computed between the search axes created from the information about the user on the one hand, and the search axes derived from the information about another user on the other hand. The presentation of contents may then be provided in reference to a plurality of search axes that are found similar to one another.

The similarity between each pair of search axes may be acquired by first computing the values of all songs owned by the user relative to each of the user's search axes. Specifically, the search axis comparison section 44 computes the values of all songs in the user's possession on each of the search axes in question so as to find similarities between the values on the search axes involved. The results of the computations are used to find eventually the similarities between the search axes.

Described below is how search axis values are typically estimated through the use of regression equations.

Figure 22:
FIG. 22 is a tabular view explanatory of how the similarity between search axes is computed.

As shown in FIG. 22, it may be assumed that the user owns song 1 through song 8. On that assumption, each of song 1 through song 8 is first subjected to computation of its value on one search axis of "preference" created from the information about the user. The song is then subjected to computation of its value on another search axis of "reproduction frequency" created from the information about another user.

Illustratively, as shown in FIG. 22, the values of song 1 through song 8 may be computed to be 0.5, 0.4, 0.1, 0.2, 0.4, 0.3, 0.2, and 0.5, respectively, on the search axis of "preference." These values are computed by applying the regression equation defining the search axis of "preference" for axis value estimation to the feature quantities of song 1 through song 8.

Likewise, the values of song 1 through song 8 may be computed to be 0.2, 0.5, 0.4, 0.1, 0.2, 0.5, 0.2, and 0.4, respectively, on the search axis of "reproduction frequency." These values are computed by applying the regression equation defining the search axis of "reproduction frequency" for axis value estimation to the feature quantities of song through song 8.

The similarity between the pair of search axes is then obtained by computing the correlation coefficient regarding each of song 1 through song 8 between the values on the search axis of "preference" on the one hand, and those on the search axis of "reproduction frequency" on the other hand.

More specifically, the correlation coefficient may be computed between a "preference" vector made up of eight values of song 1 through song 8 on the search axis of "preference" on the one hand, and a "reproduction frequency" vector constituted by eight values of song 1 through song 8 on the search axis of "reproduction frequency" on the other hand. The correlation coefficient thus obtained is deemed to represent the similarity between the search axis of "preference" and the search axis of "reproduction frequency."

If the correlation coefficient between the "preference" vector and the "reproduction frequency" vector is computed to be 0.1, then the similarity between the search axis of "preference" and the search axis of "reproduction frequency" is considered to be 0.1.

Figure 23:
FIG. 23 is another tabular view explanatory of how the similarity between search axes is computed.

What follows is a description of how search axis values are estimated through the use of discriminants As shown in FIG. 23, it may also be assumed that the user owns song 1 through song 8. On that assumption, each of song 1 through song 8 is first subjected to computation of its value on one search axis of "liked songs" created from the information about the user (the song is either "liked" or "not liked"). The song is then subjected to computation of its value on another search axis of "songs played frequently" created from the information about another user (the song is either "played frequently" or "not played frequently").

Illustratively, as shown in FIG. 23, the values of song 1 through song 8 may be computed to be "Yes," "Yes," "No," "No," "Yes," "No," "No," and "Yes," respectively, on the search axis of "liked songs." These values are computed by applying the discriminants defining the search axis of "liked songs" for axis value estimation to the feature quantities of song 1 through song 8.

Likewise, the values of song 1 through song 8 may be computed to be "No," "Yes," "Yes," "No," "No," "Yes," "No," and "Yes," respectively, on the search axis of "songs played frequently." These values are computed by applying the discriminants defining the search axis of "songs played frequently" for axis value estimation to the feature quantities of song 1 through song 8.

The similarity between the pair of search axes is then obtained by computing the concordance rate regarding each of song 1 through song 8 between the values on the search axis of "liked songs" on the one hand, and those on the search axis of "songs played frequently" on the other hand. Illustratively, the concordance rate may be computed by dividing the number of the songs whose search axis values are found concordant with one another by the number of the songs whose search axis values are either concordant or comparable with one another.

More specifically, the value of song 1 on the search axis of "liked songs" is found to be "Yes" while the value of the same song on the search axis of "songs played frequently" is "No." That means the search axis values of song 1 are not concordant with each other. The value of song 2 on the search axis of "liked songs" is found to be "Yes" and the value of the same song on the search axis of "songs played frequently" is also "Yes." That means the search axis values of song 2 are concordant with each other.

In the example of FIG. 23, the search axis values are found concordant with one another for song 2, song 4, song 7, and song 8 out of the eight songs 1 through 8. That means the concordance rate is 0.5 (i.e., four divided by eight).

Illustratively, the concordance rate is computed between a "liked songs" vector made up of eight values of song 1 through song 8 on the search axis of "liked songs" on the one hand, and a "songs played frequently" vector formed by eight values of song 1 through song 8 on the search axis of "songs played frequently" on the other hand. The concordance rate thus obtained is deemed to represent the similarity between the search axis of "liked songs" and the search axis of "songs played frequently."

If the concordance rate between the "liked songs" vector and the "songs played frequently" vector is computed to be 0.50, then the similarity between the search axis of "liked songs" and the search axis of "songs played frequently" is considered to be 0.50.

It might happen that similarity is to be obtained between a search axis on which the values are estimated by a regression equation on the one hand, and another search axis on which the values are determined by discriminants on the other hand. In such a case, the search axis values estimated by the regression equation are converted into binary values in reference to a predetermined threshold level preparatory to concordance rate computations. The concordance rate between the pair of search axes is then computed and regarded as the similarity therebetween.

The foregoing description has shown how the search axis comparison section 44 acquires the similarity between each pair of search axes.

The search axis comparison section 44 computes the similarity between every pair of all search axes created from the information about the user and of all search axes created from the information about another user adopted for comparison.

Illustratively, as shown in FIG. 24, similarities may be computed between all pairs of the user's search axes including those of "preference," "reproduction frequency," "tasteful," and "intense," and of another user's search axes such as those of "preference," "reproduction frequency," "classic," and "soothing" utilized for comparison purposes.

In the example of FIG. 24, the search axis comparison section 44 computes the similarity to be 0.5 between the search axis of "preference" created from the information about the user on the one hand, and the search axis of "preference" derived from the information about another user on the other hand. The search axis comparison section 44 then computes the similarity to be 0.8 between the search axis of "preference" for the user on the one hand, and the search axis of "reproduction frequency" for another user on the other hand. Likewise, the search axis comparison section 44 computes the similarity to be 0.9 between the search axis of "preference" for the user on the one hand, and the search axis of "classic" for another user on the other hand. The search axis comparison section 44 proceeds to compute the similarity to be 0.6 between the search axis of "preference" for the user on the one hand, and the search axis of "soothing" for another user on the other hand.

In like manner, as shown in FIG. 24, the search axis comparison section 44 computes the similarity to be 0.4 between the search axis of "reproduction frequency" created from the information about the user on the one hand, and the search axis of "preference" derived from the information about another user on the other hand. The similarity is further computed by the search axis comparison section 44 to be 0.5, 0.9, and 0.5, respectively, between the user's search axis of "reproduction frequency" and another user's search axis of "reproduction frequency"; between user's search axis of "reproduction frequency" and another user's search axis of "classic"; and between the user's search axis of "reproduction frequency" and another user's search axis of "soothing."

As shown also in FIG. 24, the similarity is computed by the search axis comparison section 44 to be 0.7, 0.6, 0.4, and 0.1, respectively, between the user's search axis of "tasteful" and another user's search axis of "preference"; between the user's axis of "tasteful" and another user's search axis of "reproduction frequency"; between the user's axis of "tasteful" and another user's search axis of "classic"; and between the user's search axis of "tasteful" and another user's search axis of "soothing."

Furthermore, the similarity is computed by the search axis comparison section 44 to be 0.5, 0.9, 0.3, and 0.8, respectively, between the user's search axis of "intense" and another user's search axis of "preference"; between the user's axis of "intense" and another user's search axis of "reproduction frequency"; between the user's axis of "intense" and another user's search axis of "classic"; and between the user's search axis of "intense" and another user's search axis of "soothing."

After the similarities between the search axes have been computed by the search axis comparison section 44, the display section 45 presents the user with the search axes that are significantly similar to one another.

Illustratively, if the search axes of progressively lower similarities are to be presented, then the display section 45 may selectively present the user with the search axes between which the similarity is the highest, the search axes between which the similarities are found higher than a predetermined threshold level, or a predetermined number of search axes with decreasing similarities therebetween.

More specifically, if the similarities between the search axes are computed as shown in FIG. 24, then the search axes with the highest similarity of 0.9 therebetween are selected. In this case, the user may be presented with the search axis of "preference" created from the information about the user and the search axis of "classic" derived from the information about another user, as similar axes among others.

If another user is Mr./Ms A, then the display section 45 may be arranged to display a message such as "Your preferred songs are Mr./Ms A's classics."

The user may also be presented with the search axis of "reproduction frequency" created from the information about the user and the search axis of "classic" derived from the information about another user, as similar axes.

Furthermore, the user may be presented with the search axis of "intense" created from the information about the user and the search axis of "reproduction frequency" derived from the information about another user, as similar axes. If another user is Mr./Ms A, then the display section 45 may be arranged to display a message such as "The songs you regard as intense are played frequently by Mr./Ms A."

These messages may be generated using suitable templates stored beforehand. When a message is to be created, one of these templates need be filled with appropriate words based on the names of the search axes in question and other related information.

In another example, the user may be presented with a pair of search axes that are opposite to each other, one axis being created from the information about the user and the other axis being derived from the information about another user. Illustratively, if the similarity between search axes is defined by a positive or negative correlation coefficient therebetween, then, out of the search axes with similarities computed as negative values therebetween, those axes with the largest similarity in absolute value may be selected and presented to the user on the display section 45.

In a further example, the user may be presented with a pair of search axes that are unrelated to each other, one axis being created from the information about the user and the other axis being derived from the information about another user. Illustratively, if the similarity between search axes is defined by a correlation coefficient therebetween, then, out of the search axes with computed similarities therebetween, those axis with the smallest similarity in absolute value may be selected and presented to the user on the display section 45.

In an even further example, the user may be presented with the similarity between a pair of matching search axes, one derived from the information about the user and the other from the information about another user. Illustratively, the similarity may be obtained between the user's search axis of "preference" and another user's search axis of "preference," or between the user's search axis of "classic" and another user's search axis of "classic," and presented to the user on the display section 45.

When similar search axes are to be presented to the user, the display section 45 may illustratively display first and second images in overlapping fashion. The first images may constitute a space of at least two dimensions each represented by a search axis on which the positions of applicable songs are displayed, while the second images may appear in a lighter tone than the first images and constitute a space of the same dimensions each represented by the search axis similar to the matching axis in the first images.

Figure 26:
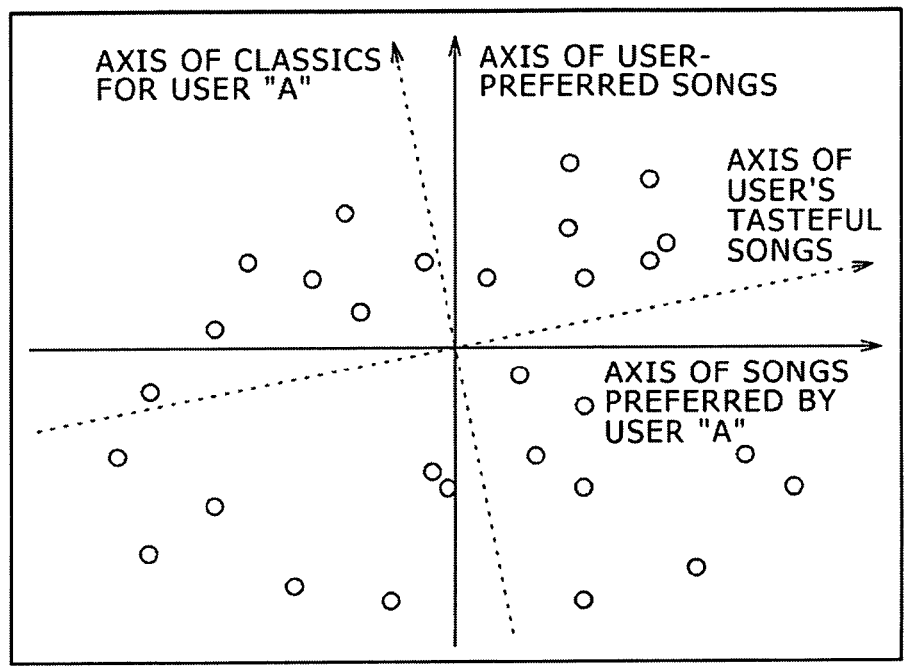
FIG. 26 is a schematic view showing typical similar search axes in overlapping fashion.

As shown in FIG. 26, the display section 45 may display images showing the search axis of "user-preferred songs" created from the information about the user and the search axis of "songs preferred by user 'A'" derived from the information about another user "A." The two search axes are displayed in a dark tone as the axes in solid lines defining a two-dimensional space in FIG. 26.

In the above two-dimensional space defined by the two search axes, one representing the user's preference for songs and the other denoting another user's preference for songs, the display section 45 may indicate symbols such as small circles representative of the songs involved.

The display section 45 may further display another image showing the search axis of "classics for user 'A'" which is created from the information about another user and which is found similar to the search axis of "user-preferred songs" derived from the information about the user. This search axis is displayed as a broken line in a light tone in the two-dimensional space of FIG. 26.

The display section 45 may also display yet another image showing the search axis of "user's tasteful songs" which is created from the information about the user and which is found similar to the search axis of "songs preferred by user 'A'" derived from the information about another user "A." This search axis is also displayed as a broken line in a light tone in the two-dimensional space of FIG. 26.

The gradient of the search axes found similar to the search axes that define the space of at least two dimensions for presenting songs is determined by the similarity between the axes involved. Illustratively, if the similarity between the search axes is computed as a correlation coefficient therebetween, then the gradient of the similar search axes to the reference axis or to the axis perpendicular to the reference axis is regarded as representative of the similarity between the axes involved. More specifically, if the similarity between the search axes is computed as the correlation coefficient of 0.8, then the gradient of the similar axes to the reference axis or to the axis perpendicular to the reference axis is considered to be 0.8. If the similarity between the search axes is computed as the correlation coefficient of −0.2, then the gradient of the similar axes to the reference axis is considered to be −0.2. If the similarities between the search axes are found to range from 0 to 1 and if the search axes are to be displayed in decreasing order of similarities, then the gradient of the similar search axes to the axes defining a space of at least two dimensions for presenting songs is obtained as the angle of $\tan^{-1}$ (1—similarity).

In the manner described above, the images of the search axes defining the space of at least two dimensions for presenting songs are displayed along with the images indicative of the search axes which are similar to these axes and which appear in a light tone in overlapping fashion.

Alternatively, the user may perform operations to select one of the search axes presented as the axes having significantly high similarities. In turn, the song search apparatus 11 may present the user with songs applicable to the search axis thus selected from the candidate axes.

For example, the values of songs on the selected search axis may be estimated by use of a regression equation. In this case, the song search apparatus 11 may present the user with the songs of which the values on the search axis are found higher than a predetermined threshold level, the songs being presented in descending order of their search axis values.

In another example, the values of songs on the selected search axis may be estimated through the use of discriminants. In such a case, the song search apparatus 11 may present the use with the songs of which the values on the search axis are found either "Yes" or "No" in referenced to a predetermined value.

Figure 27:
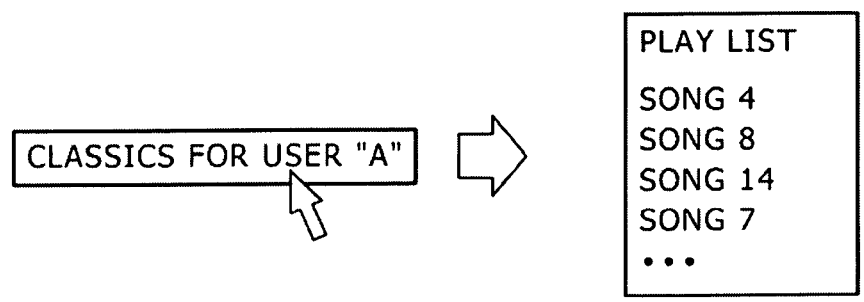
FIG. 27 is a schematic view showing a typical operation for selecting a search axis.

More specifically, as shown in FIG. 27, the user may operate the operation section 36 to click on the button for selecting the search axis of "classics for user 'A'." This search axis, created from the information about another user "A," is selected from among the search axes that are found significantly similar to a predetermined search axis or axes. With the search axis thus selected, the song search apparatus 11 presents the user illustratively with song 4, song 8, song 14, and song 7 which are deemed classics in reference to the selected search axis. In this case, the song search apparatus 11 may typically present the user with a play list constituted by the songs found applicable on the selected search axis.

Figure 28:
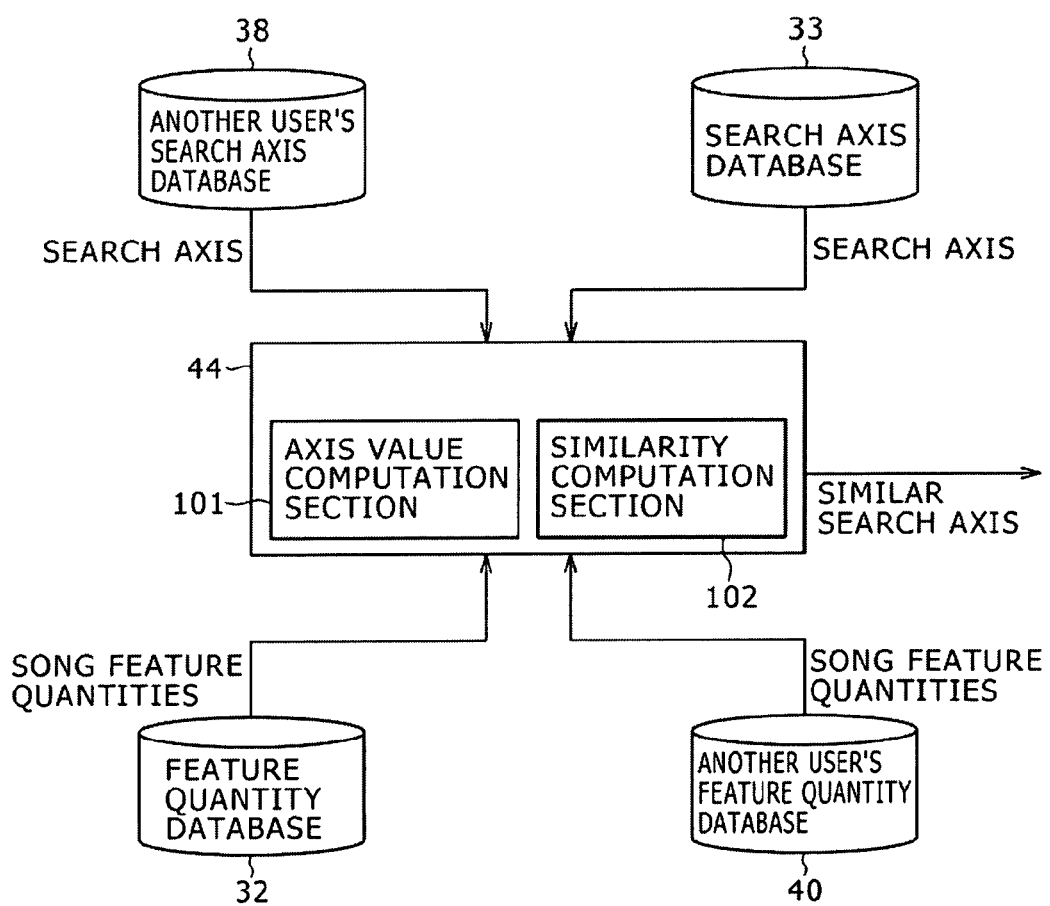
FIG. 28 is a block diagram showing a typical structure for computing the similarity between search axes.

FIG. 28 is a block diagram showing a typical structure in the setup of FIG. 2 for computing the similarity between search axes.

It may be noted that the search axis comparison section 44 includes an axis value computation section 101 and a similarity computation section 102.

In operation, the search axis comparison section 44 acquires the search axes between which the similarity is to be computed, from the search axis database 33 or from another user's search axis database 38. That is, the search axis comparison section 44 obtains from the search axis database 33 or another user's search axis database 38 the regression equation or discriminants for estimating the values on the target search axes subject to computation of the similarity therebetween.

The search axis comparison section 44 acquires the feature quantities of the songs owned by the user from the feature quantity database 32. The axis value computation section 101 in the search axis comparison section 44 applies the regression equation or discriminants to the feature quantities of the songs in the user's possession, so as to compute the values of these songs on the search axes involved.

The similarity computation section 102 in the search axis comparison section 44 computes the similarity between the values on the target search axes subject to similarity computation. The similarity thus obtained is considered to be the similarity between the search axes in question.

Alternatively, the search axis comparison section 44 may acquire the feature quantities of the songs owned by another user from another user's feature quantity database 40. Based on the feature quantities of the songs in another user's possession, the search axis comparison section 44 may compute the similarity between the search axes involved.

As another alternative, the search axis comparison section 44 may compute the similarity between search axes based on the feature quantities of the songs owned by the user and on the feature quantities of the songs in another user's possession.

As a further alternative, the search axis comparison section 44 may compute the similarity between search axes based on the feature quantities of part of all songs owned by the user or by another user. Illustratively, the search axis comparison section 44 may compute the similarity between the search axes of interest on the basis of the feature quantities of a predetermined number of songs. Typically, the search axis comparison section 44 may acquire the feature quantities of a predetermined number of randomly selected songs for computation of search axis similarities.

After computing the similarities between the search axes, the search axis comparison section 44 acquires and outputs the search axes that are found significantly similar to one another.

Figure 29:
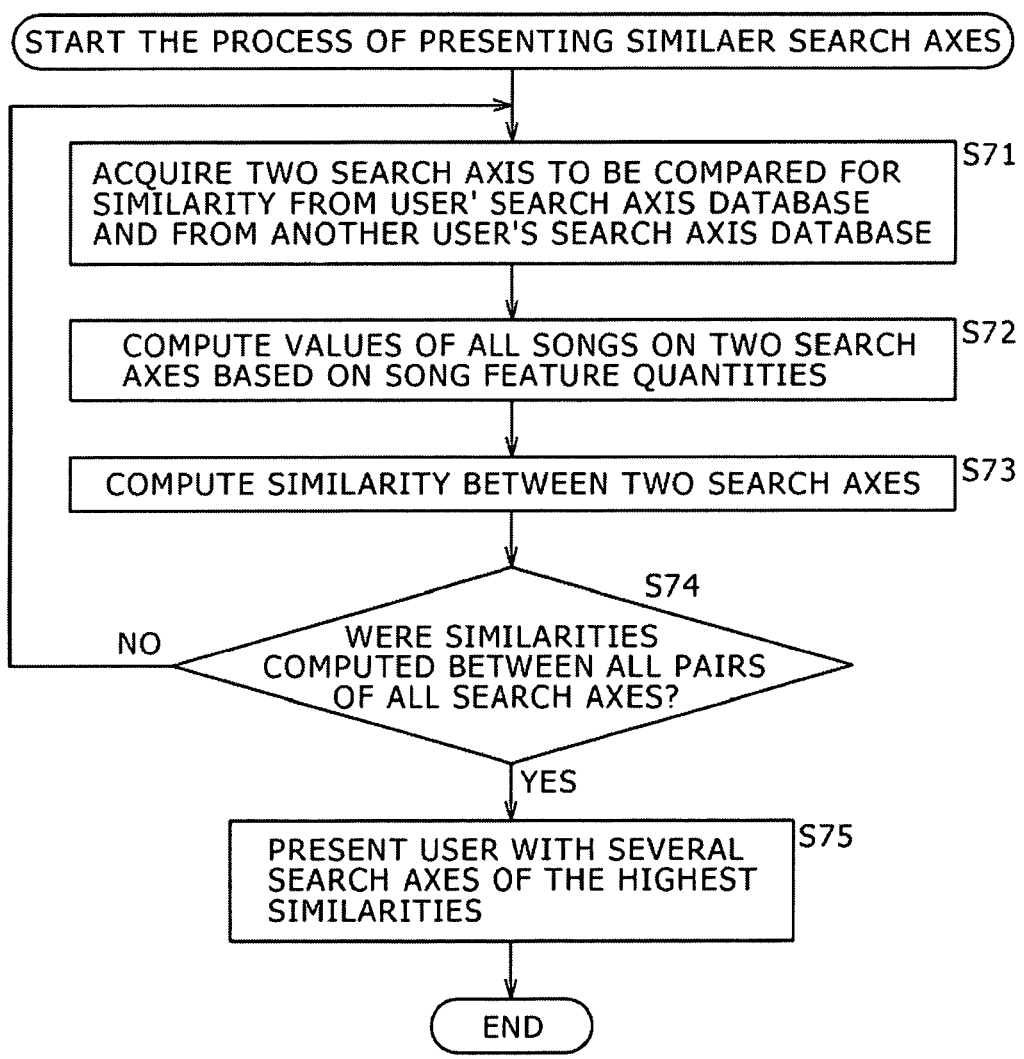
FIG. 29 is a flowchart of steps constituting a typical process of presenting similar search axes.

FIG. 29 is a flowchart of steps constituting a typical process of presenting similar search axes. In step S71, the search axis comparison section 44 acquires two search axes to be compared for similarity from the search axis database 33 or another user's search axis database 38.

In step S72, the search axis comparison section 44 uses the feature quantities of all songs owned by the user to compute the values of these songs on the two search axes. Illustratively, the search axis comparison section 44 first acquires the feature quantities of all songs in the user's possession from the feature quantity database 32. The axis value computation section 101 in the search axis comparison section 44 applies the regression equations or discriminants of the two search axes to the feature quantities of all songs owned by the user, so as to compute the values of these songs in reference to the two search axes.

In step S73, the search axis comparison section 44 computes the similarity between the two search axes. More specifically, the similarity computation section 102 in the search axis comparison section 44 computes the similarity between the two search axes based on the values computed in step S72.

In step S74, the search axis comparison section 44 checks to determine whether all pairs of all search axes have been subjected to computation of the similarities therebetween. If the similarities have yet to be computed between all pairs of all search axes involved, then control is returned to step S71 and the subsequent steps are repeated.

If in step S74 the similarities are found to have been computed between every pair of the search axes involved, then step S75 is reached. In step S75, the display section 45 presents the user with several pairs of search axes between which the similarities are significantly high. This brings to an end the process of presenting similar search axes. More specifically, in step S75, the search axis comparison section 44 may select a predetermined number of similarities in decreasing order, find the search axes associated with the selected similarities, and output the search axes thus obtained to the display section 45 for display of similar search axes. In turn, the display section 45 displays the similar search axes that have been supplied by the search axis comparison section 44.

In the case above, the display section 45 may illustratively give its display in one of two forms. In one form, the names of the similar search axes may be displayed. In another form, as explained above with reference to FIG. 26, the display section 45 may display first and second images in overlapping fashion, the first images constituting a space of at least two dimensions each represented by a search axis on which the positions of applicable songs are displayed, the second images appearing in a lighter tone than the first images and constituting a space of the same dimensions each represented by the search axis similar to the matching axis in the first images.

What follows is a description of how the positions of the user's songs and those of another user's songs are displayed illustratively in overlapping fashion in a space of at least two dimensions represented by the search axes for presenting songs.

Figure 30:
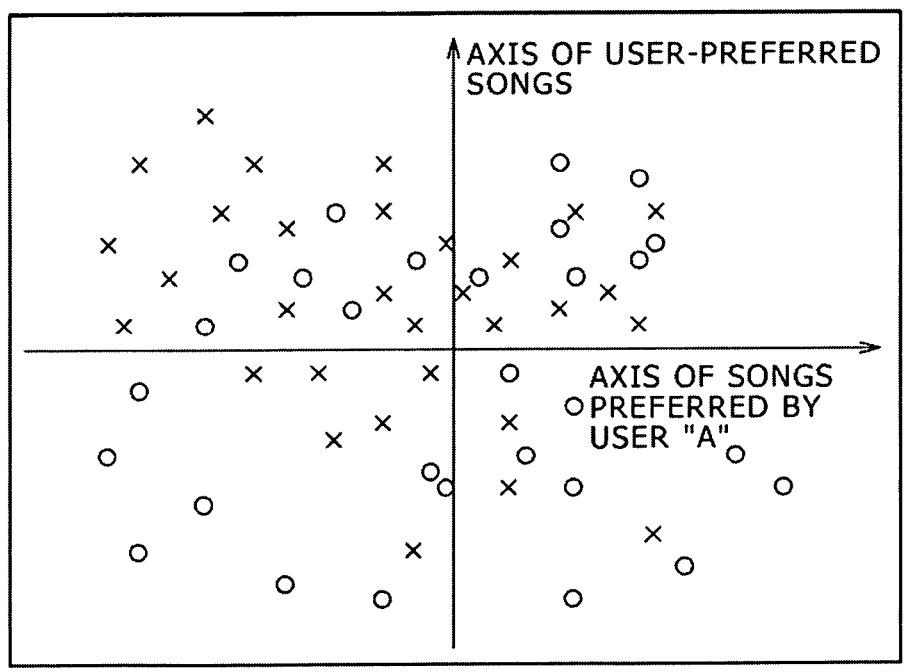
FIG. 30 is a schematic view showing typical positions of the user's and another user's songs in overlapping fashion.

For example, as shown in FIG. 30, the positions of the user's songs and those of another user's songs may be displayed in overlapping fashion in a space of two dimensions represented by two search axes, one axis being the search axis of "user-preferred songs" created from the information about the user, the other axis being the search axis of "songs preferred by user 'A'" derived from the information about another user "A." In FIG. 30 showing the space of two dimensions formed by the two search axes, circles stand for the positions of the user's songs and crosses denote those of the songs owned by user "A."

Figure 31:
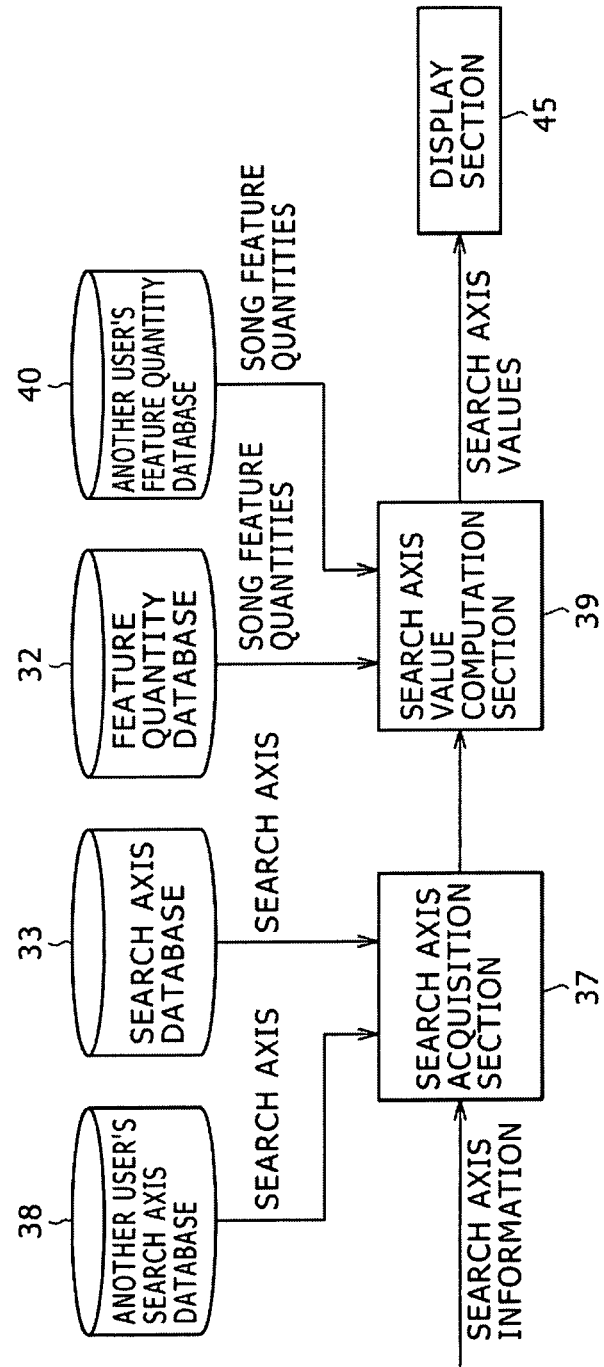
FIG. 31 is a block diagram showing a typical structure for displaying the positions of the user's songs and those of another user's songs in a space of at least two dimensions.

FIG. 31 is a block diagram showing a typical structure in the setup of FIG. 2 for displaying the positions of the user's songs and those of another user's songs in a space of at least two dimensions.

In operation, the operation section 36 supplies the search axis acquisition section 37 with search axis information that reflects the user's operations on the operation section 36 and represents the search axes to be used for search. In turn, the search axis acquisition section 37 acquires the search axes designated by the search axis information from the search axis database 33 or from another user's search axis database 38. That is, the search axis acquisition section 37 acquires from the search axis database 33 or another user's search axis database 38 the regression equations or discriminants for estimating values on the search axes specified by the search axis information.

Figure 32:
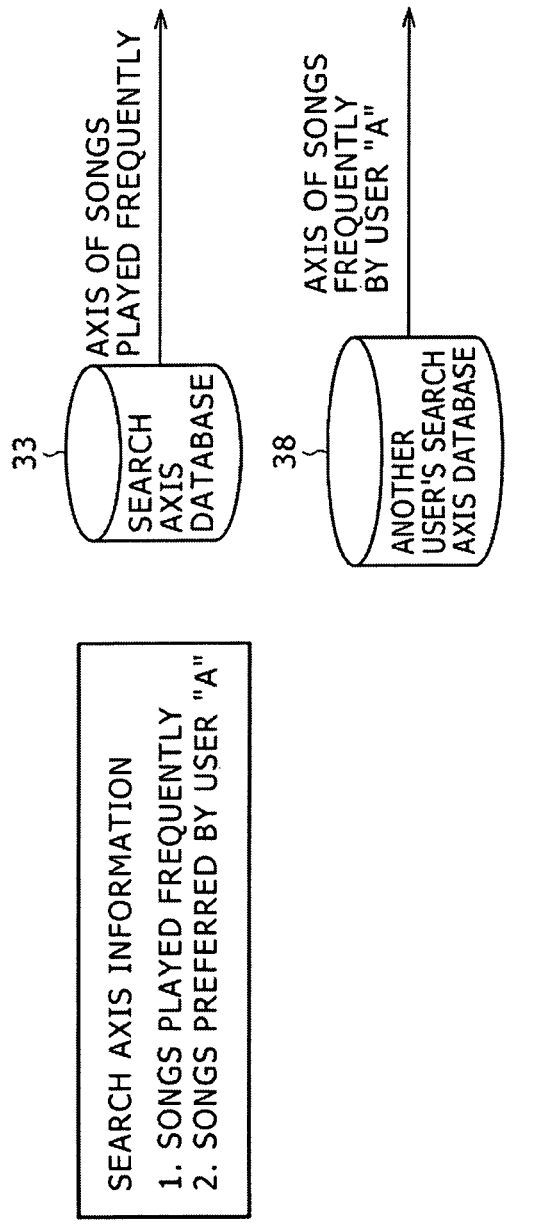
FIG. 32 is a schematic view explanatory of how search axes are acquired.

Illustratively, as shown in FIG. 32, suppose that the operation section 36 supplies the search axis information designating the search axis of "songs played frequently" as well as the search axis of "songs preferred by user 'A'." In that case, the search axis acquisition section 37 acquires the search axis named "songs played frequently" indicating the user's preference from the search axis database 33 and the search axis named "songs preferred by user 'A'" representing another user's preference from another user's search axis database 38.

In the above case, the search axis acquisition section 37 acquires from the search axis database 33 the regression equation defining the user's search axis of "songs played frequently" and obtains from another user's search axis database 38 the regression equation defining another user's search axis of "songs preferred by user 'A'."

The search axis acquisition section 37 then supplies the search axis value computation section 39 with the acquired search axes, i.e., the regression equations or discriminants defining these search axes.

The search axis value computation section 39 acquires the feature quantities of the songs owned by the user from the feature quantity database 32 and the feature quantities of the songs in another user's possession from another user's feature quantity database 40. The search axis value computation section 39 proceeds to apply the regression equations or discriminants sent from the search axis acquisition section 37 to the feature quantities of the user's songs and to those of another user's songs, so as to compute the values of these songs on the search axes involved.

Illustratively, the search axis value computation section 39 acquires the feature quantities of all songs owned by the user from the feature quantity database 32, and obtains the feature quantities of all songs owned by another user from another user's feature quantity database 40. Based on the feature quantities thus acquired, the search axis value computation section 39 computes the values of the songs involved on the respective search axes.

Figure 33:
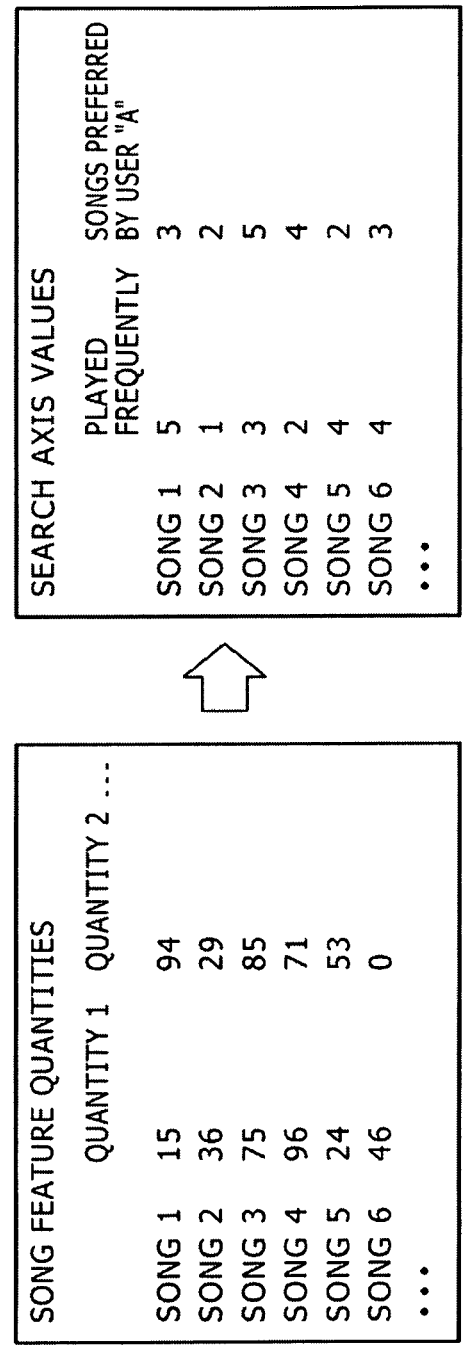
FIG. 33 is a schematic view explanatory of how search axis values are computed.

More specifically, as shown in FIG. 33, the search axis value computation section 39 may apply the regression equations defining the search axes of "songs played frequently" and of "songs preferred by user 'A'" to the feature quantities of song 1 including the feature quantities 1 and 2 of 15 and 94, respectively. The application of the regression equations makes it possible to compute the value of "5" for song 1 on the search axis of "songs played frequently" and the value of "3" for the same song on the search axis of "songs preferred by user 'A'."

The search axis value computation section 39 also applies the regression equations defining the search axes of "songs played frequently" and of "songs preferred by user 'A'" to the feature quantities of song 2 including the feature quantities 1 and 2 of 36 and 29, respectively. The application of the regression equations computes the value of "1" for song 2 on the search axis of "songs played frequently" and the value of "2" for the same song on the search axis of "songs preferred by user 'A'."

Likewise, the search axis value computation section 39 applies the regression equations defining the search axes of "songs played frequently" and of "songs preferred by user 'A'" to the feature quantities of song 3 through song 6. The application of the regression equations computes the values for song 3 through song 6 on the search axis of "songs played frequently" and the values for the same songs on the search axis of "songs preferred by user 'A'."

The search axis value computation section 39 supplies the display section 45 with the values of the songs involved on the search axes in question.

Given the search axis values of the songs, the display section 45 displays the positions of the user's songs and those of another user's songs in a space of at least two dimensions represented by the search axes involved, the song positions being shown in overlapping fashion.

Illustratively, as shown in FIG. 30, the positions of the user's songs and those of another user's songs may be displayed in overlapping fashion in a space of two dimensions represented by two search axes, one axis being the search axis of "user-preferred songs" created from the information about the user, the other axis being the search axis of "songs preferred by user 'A'" derived from the information about another user "A."

FIG. 34 is a flowchart of steps constituting a typical process of displaying another user's contents in overlapping fashion. In step S91, the search axis acquisition section 37 acquires at least two search axes for use in display from the search axis database 33 or from another user's search axis database 38. That is, the search axis comparison section 44 obtains from the search axis database 33 or from another user's search axis database 38 the regression equations or discriminants for estimating values on at least two search axes used for display.

In step S92, the search axis value computation section 39 computes the values of all songs owned by the user and of all songs owned by another user on the search axes involved on the basis of the feature quantities of the user's songs and those of another user's songs. More specifically, the search axis value computation section 39 acquires the feature quantities of all songs owned by the user from the feature quantity database 32 and obtains the feature quantities of all songs in another user's possession from another user's feature quantity database 40. The search axis value computation section 39 proceeds to apply the regression equations or discriminants defining the search axes in question to the feature quantities of the user's songs and to those of another user's songs, so as to compute the values of these songs on the search axes involved.

In step S93, the display section 45 arranges to display all songs owned by the user and by another user in a space of dimensions represented by the search axes; the positions of another user's contents are displayed in overlapping fashion. Illustratively, as shown in FIG. 30, the display section 45 may display the positions of the songs of interest in overlapping fashion in a space of at least two dimensions represented by search axes, the positions of the songs being determined by their values computed on the search axes involved.

Figure 35:
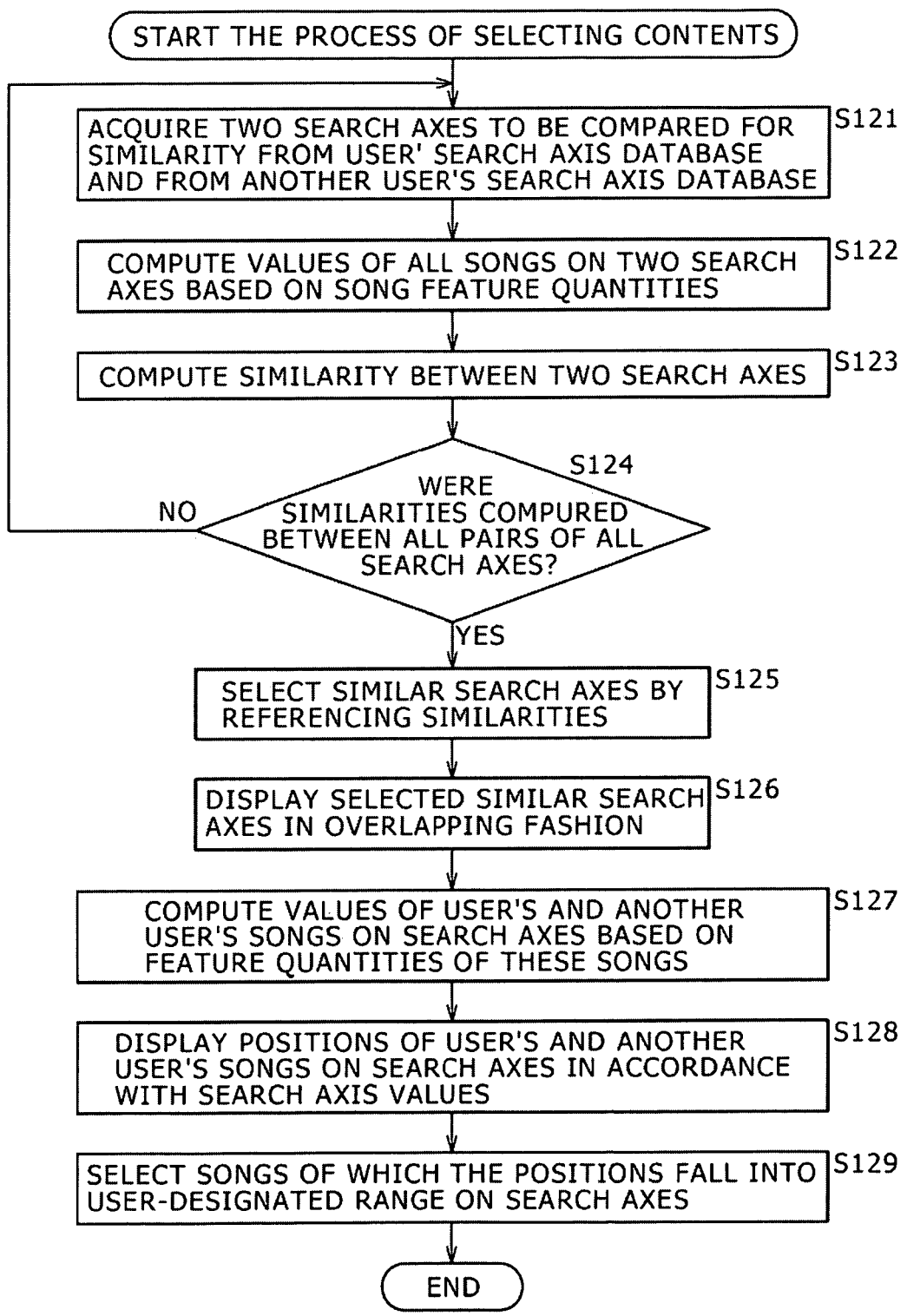
FIG. 35 is a flowchart of steps constituting a typical process of selecting contents.

FIG. 35 is a flowchart of steps constituting a typical process of selecting contents. Steps S121 through S124 are the same as steps S71 through S74 in FIG. 29 and thus will not be discussed further.

In step S124, a check is made to determine whether the similarities between all pairs of all search axes have been computed. If the result of the check in step S124 is affirmative, then step S125 is reached. In step S125, the search axis comparison section 44 selects similar search axes by referring to the computed similarities. The search axis comparison section 44 then outputs the selected search axes to the display section 45.

In step S126, the display section 45 displays the selected search axes that are found similar to one other in overlapping fashion. Illustratively, as discussed above with reference to FIG. 26, the display section 45 may display the image of one selected search axis in a dark tone and the image of another selected search axis in a light tone, the images being displayed in an overlapping manner.

In step S127, the search axis value computation section 39 computes the values of the user's songs and those of another user's songs on the search axes of interest based on the feature quantities of these songs in the same manner as in step S92. Illustratively, on the basis of the feature quantities of the user's songs and of another user's songs, the search axis value computation section 39 may compute the values of these songs on the search axis displayed in the dark tone by the display section 45.

In step S128, the display section 45 displays the positions of the user's songs and those of another user's songs on the search axes in accordance with the values of these songs computed on the search axes in question. More specifically, the display section 45 displays images showing the positions of the user's and another user's songs on the search axes involved.

In step S129, the applicable song selection section 41 selects the songs of which the positions fall into a user-designated range of the search axes. This brings to an end the process for selecting contents. Illustratively, in step S129, the applicable song selection section 41 selects the contents of which the positions fall into that range over the search axes which is designated by the information supplied by the operation section 36 reflecting the user's operations.

In the manner described above, the search axes personalized for search purposes are used by and shared among a plurality of users.

The song search apparatus 11 creates the search axes in a manner personalized for each user either automatically or in keeping with user input. The search axes thus created are shared among the users involved.

The song search apparatus 11 can search for songs based on ordinary search axes prepared in advance (e.g., search axes on which to search for contents in accordance with their metadata), on the search axes created by the apparatus 11 itself, and on another user's search axes created by another song search apparatus 11 owned by another user.

The song search apparatus 11 compares each of the user's own search axes with each of another user's search axes to find the degree of similarity therebetween. Following the comparison, the song search apparatus 11 presents the user with the user's search axes that are found significantly similar to some of another user's search axes. Alternatively, the song search apparatus 11 may present the user with another user's search axes that are found significantly similar to some of the user's search axes.

When the user selects some of the presented search axes, the song search apparatus 11 starts searching for songs on the selected search axes.

The search may be performed by the song search apparatus 11 within a range over a map of at least two dimensions represented by at least two search axes, the map being arranged to show images of the songs serving as the objects of search. The song search apparatus 11 may then display images of the songs owned by another user in a manner overlapping with this map.

The song search apparatus 11 compares each of the user's search axes with each of another user's search axes to find the similarity therebetween. The song search apparatus 11 proceeds to present the user with combinations of similar search axes. This allows the user to know how his or her search axes compare with another user's search axes.

On the map created based on suitable search axis, the song search apparatus 11 displays images of the user's contents along with images of another user's contents in overlapping fashion as described. This allows the user to know in what manner another user's contents are distributed with regard to the user's own contents.

As explained above, the user can make a search for songs based on personalized search axes. Illustratively, the user can search for such songs as preferred songs, songs played frequently, tasteful songs (i.e., songs considered tasteful by the user), and songs to be played during a meal (i.e., songs that the user wants to hear during a meal).

According to the present embodiment, as described above, contents can be presented to the user based on the search axes that have been specifically created. The presentation of contents may be controlled along the search axes which serve as the reference for search purposes and which are created through learning based on the feature quantities of the contents, on the history of reproduction of the contents, or on the evaluations of these contents by the user. In such cases, the contents may be presented to the user easily in a manner personalized for the user.

The song search apparatus 11 may be any one of stationary household electronic apparatuses including hard disk recorders, hard desk players, and home-use video game consoles; or any one of portable electronic devices such as portable game machines, portable players, and mobile phones.

The series of the steps and processes described above may be executed either by hardware or by software. For the software-based processing to take place, the programs constituting the software may be either incorporated beforehand in dedicated hardware of a computer for program execution or installed upon use from a suitable program recording medium into a general-purpose personal computer or like equipment capable of executing diverse functions based on the installed programs.

Figure 36:
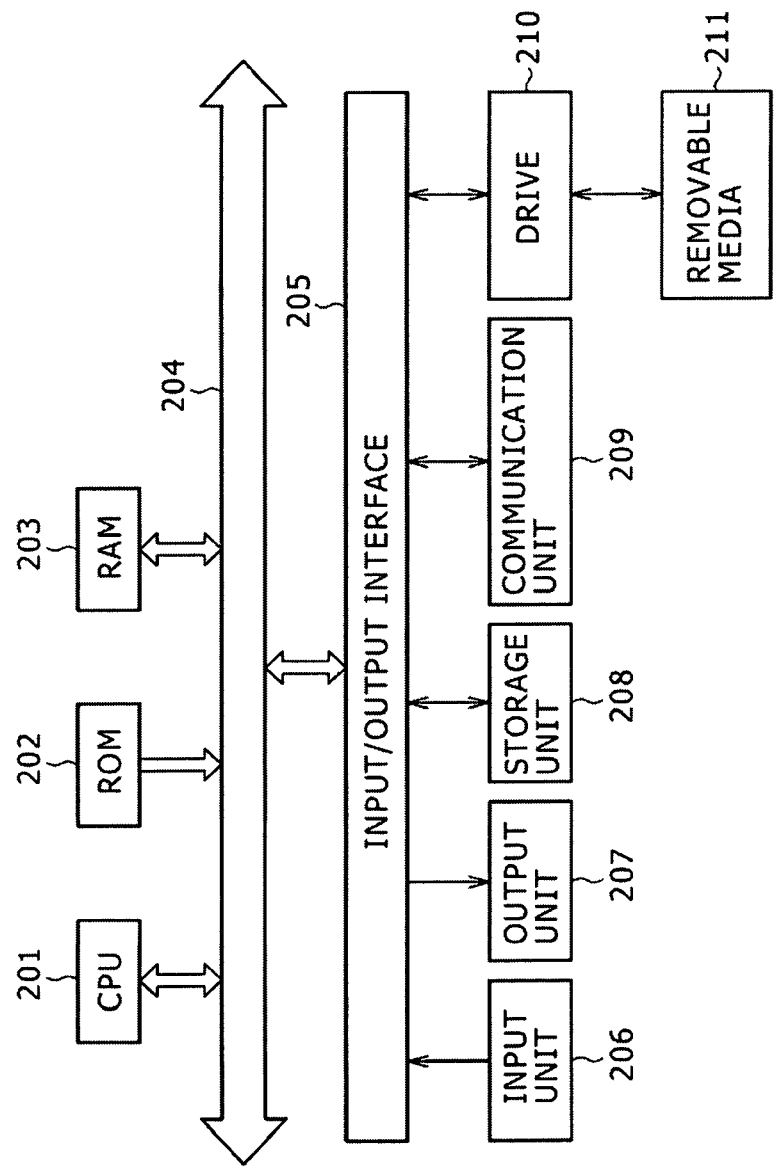
FIG. 36 is a block diagram showing a typical hardware structure of a computer.

FIG. 36 is a block diagram showing a typical hardware structure of a computer capable of carrying out the above-described steps and processes in the form of programs.

This computer has a CPU (central processing unit) 201, a ROM (read only memory) 202, and a RAM (random access memory) 203 interconnected by a bus 204.

An input/output interface 205 is further connected to the bus 204. The input/output interface 205 is connected with an input unit 206, an output unit 207, a storage unit 208, a communication unit 209, and a drive 210. The input unit 206 is typically made up of a keyboard, a mouse, and a microphone. The output unit 207 is formed illustratively by a display device and loudspeakers. The storage unit 208 is generally composed of a hard disk or a nonvolatile memory. The communication unit 209 is typically constituted by a network interface. The drive 210 accommodates and drives such removable media 211 as magnetic disks, optical disks, magneto-optical disks, or semiconductor memory.

In the computer structured as outlined above, the CPU 210 may carry out the above-described steps and processes by loading programs illustratively from the storage unit 208 into the RAM 203 for program execution by way of the input/output interface 205 and bus 204.

The programs to be executed by the computer (i.e., CPU 201) are typically offered to the user as recorded on the removable media 211 serving as package media including magnetic disks (including flexible disks), optical disks (including CD-ROM (compact disc read-only memory) and DVD (digital versatile disc)), magneto-optical disks, or semiconductor memory. The programs may also be offered to the user via wired or wireless communication media such as local area networks, the Internet, and digital satellite broadcasting networks.

With a suitable piece of removable media 211 attached to the drive 210, the programs may be installed from the medium into the computer when they are written to the storage unit 208 through the input/output interface 205. The programs may also be installed into the computer upon receipt by the communication unit 209 through wired or wireless communication media for storage into the storage unit 208. Alternatively, the programs may be preinstalled in the computer, recorded beforehand to the ROM 202 or to the storage unit 208.

In this specification, the programs for execution by the computer may be carried out in the depicted sequence (i.e., on a time series basis), in a parallel manner, or in individual fashion when they are invoked as necessary.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus, comprising:
a memory storing a program; and
a processor configured to execute the program to cause the information processing apparatus to:
create a first function relating feature quantities of first contents to first values of said first contents, said first created function being based on said feature quantities of said first contents and histories of reproduction of said first contents by a user;
create a second function relating feature quantities of said first contents to second values of said first contents, said second created function being based on feature quantities of first contents and evaluations of said first contents by said user;
calculate, using the first created function, first expected values of second contents based on feature quantities of said second contents;
calculate, using the second created function, second expected values of said second contents based on said feature quantities of said second contents; and
control display of a presentation of said second contents in relation to a first search axis and a second search axis in a two-dimensional space, said second contents being positioned along a direction of said first search axis based on said calculated first expected values and along a direction of said second search axis based on said second expected values,
wherein
said feature quantities are determined based on metadata associated with said first or second contents, and
at least one of said feature quantities used to create said second function differs from feature quantities used to create said first created function.

2. The information processing apparatus according to claim 1, wherein said first created function includes a regression equation.

3. The information processing apparatus according to claim 1, wherein said first created function includes a discriminant.

4. The information processing apparatus according to claim 3, wherein, when executed by the processor, the program also causes the information processing apparatus to:
apply the discriminant to the feature quantities of said first contents to calculate said first values; and
apply the discriminant to the feature quantities of said second contents to calculate said first expected values.

5. The information processing apparatus according to claim 1, wherein, when executed by the processor, the program also causes the information processing apparatus to select, from said second contents, those contents which have an expected value falling into a predetermined range on said first search axis.

6. An information processing method, comprising the steps of:
creating a first function relating feature quantities of first contents to first values of said first contents, said first created function being based on said feature quantities of said first contents and histories of reproduction of said first contents by a user;
creating a second function relating feature quantities of said first contents to second values of said first contents, said second created function being based on feature quantities of first contents and evaluations of said first contents by said user;
calculating, using the first created function, first expected values of second contents based on feature quantities of said second contents;
calculating, using the second created function, second expected values of said second contents based on said feature quantities of said second contents; and
controlling display of a presentation of said second contents in relation to a first search axis and a second search axis in a two-dimensional space, said second contents being positioned along a direction of said first search axis based on said calculated first expected values and along a direction of said second search axis based on said second expected values,
wherein
said feature quantities are determined based on metadata associated with said first or second contents, and
at least one of said feature quantities used to create said second function differs from feature quantities used to create said first created function.

7. A non-transitory computer-readable storage medium storing a program that, when executed by a processor, causes a computer to carry out a process, the process comprising the steps of:
creating a first function relating feature quantities of first contents to first values of said first contents, said first created function being based on said feature quantities of said first contents and histories of reproduction of said first contents by a user;
creating a second function relating feature quantities of said first contents to second values of said first contents, said second created function being based on feature quantities of first contents and evaluations of said first contents by said user;
calculating, using the created function, expected values of second contents based on feature quantities of said second contents;
calculating, using the second created function, second expected values of said second contents based on said feature quantities of said second contents; and
controlling display of a presentation of said second contents in relation to a first search axis and a second search axis in a two-dimensional space, said second contents being positioned along a direction of said first search axis based on said calculated first expected values and along a direction of said second search axis based on said second expected values,
wherein
said feature quantities are determined based on metadata associated with said first or second contents, and
at least one of said feature quantities used to create said second function differs from feature quantities used to create said first created function.

8. An information processing apparatus, comprising:
creation means for creating a first function relating feature quantities of first contents to first values of said first contents, said first created function being based on said feature quantities of said first contents and histories of reproduction of said first contents by a user;
creation means for creating a second function relating feature quantities of said first contents to second values of said first contents, said second created function being based on feature quantities of first contents and evaluations of said first contents by said user; calculating means for calculating, using the first created function, first expected values of second contents based on feature quantities of said second contents;
calculating means for calculating, using the second created function, second expected values of said second contents based on said feature quantities of said second contents; and
display control means for controlling display of a presentation of said second contents in relation to a first search axis and a second search axis in a two-dimensional space, said second contents being positioned along a direction of said first search axis based on said calculated first expected values and along a direction of said second search axis based on said second expected values,
wherein
said feature quantities are determined based on metadata associated with said first or second contents, and
at least one of said feature quantities used to create said second function differs from feature quantities used to create said first created function.

* * * * *